April 14, 1925. 1,533,895
J. J. PLEGER
BOOK OR PAMPHLET COVERING MACHINE
Filed Feb. 4, 1922 16 Sheets-Sheet 1
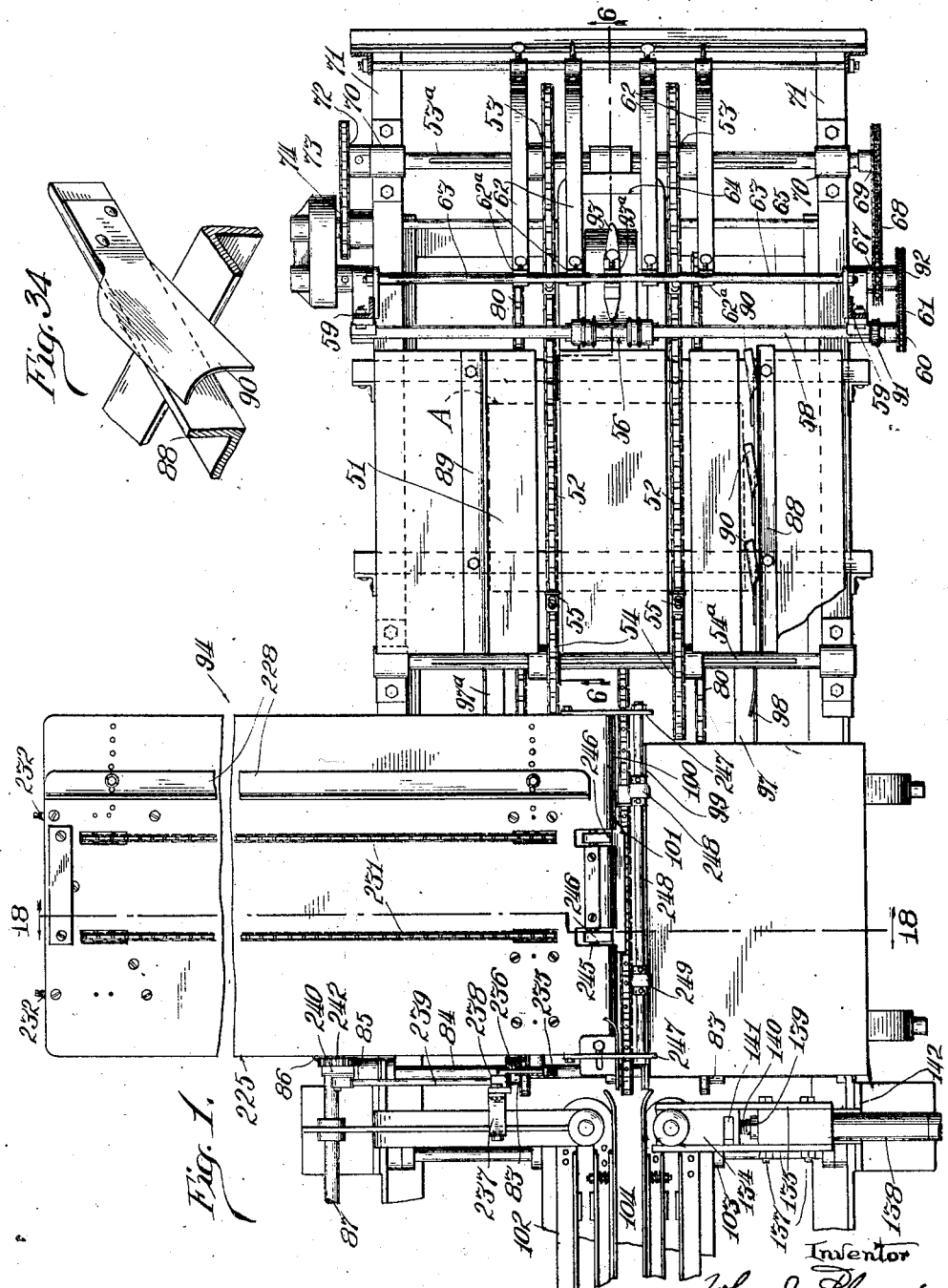

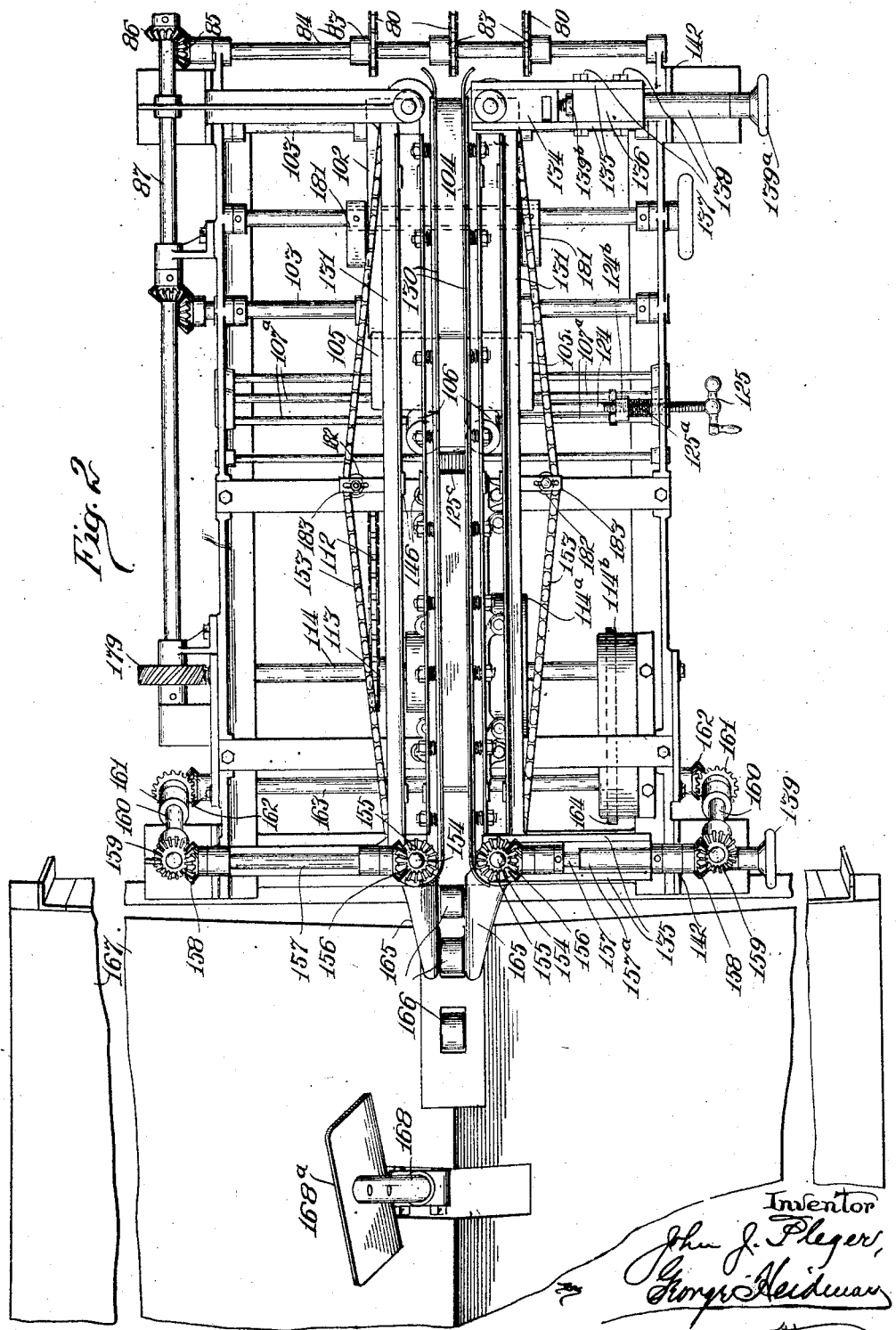

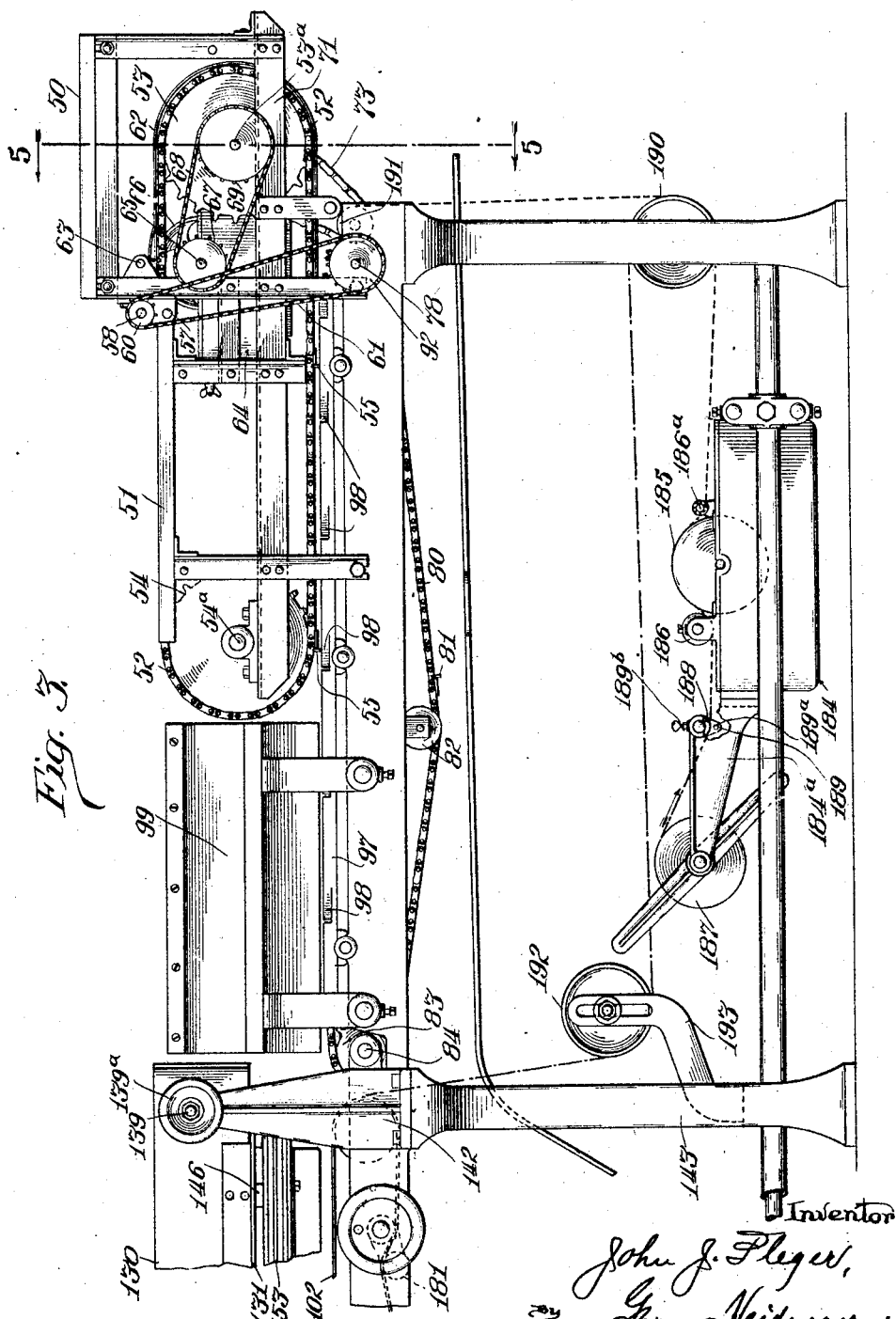

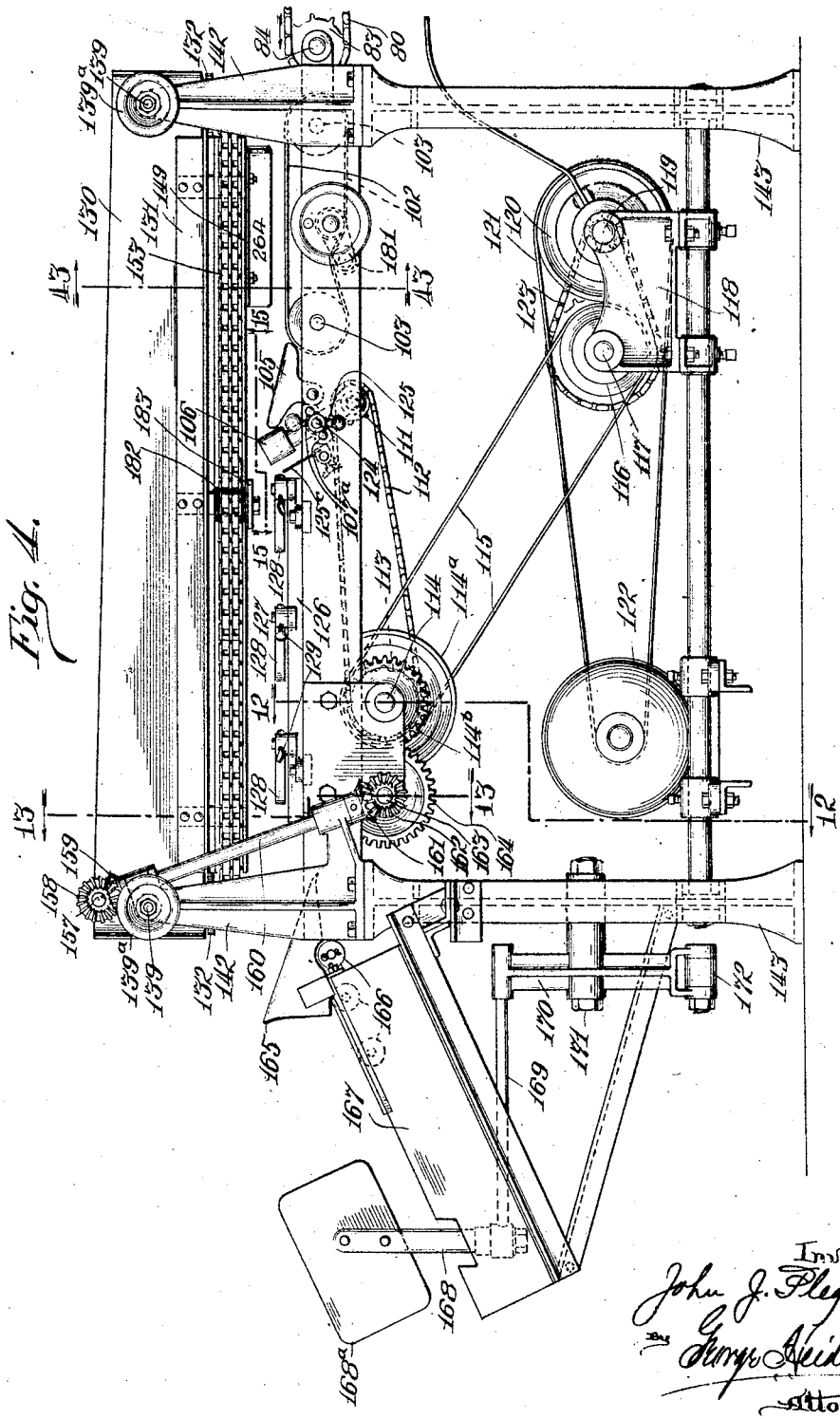

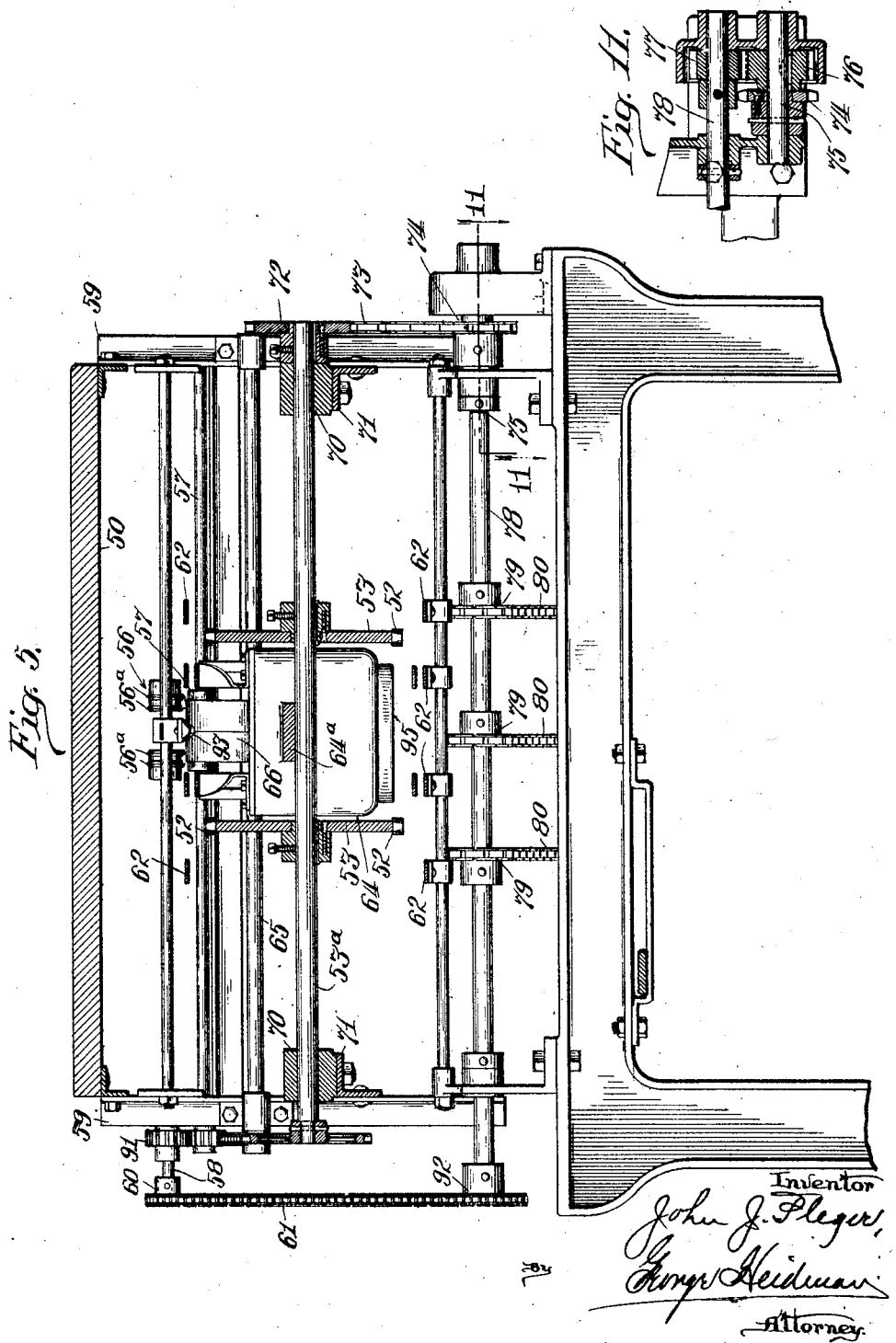

April 14, 1925.
J. J. PLEGER
1,533,895
BOOK OR PAMPHLET COVERING MACHINE
Filed Feb. 4, 1922  16 Sheets-Sheet 6
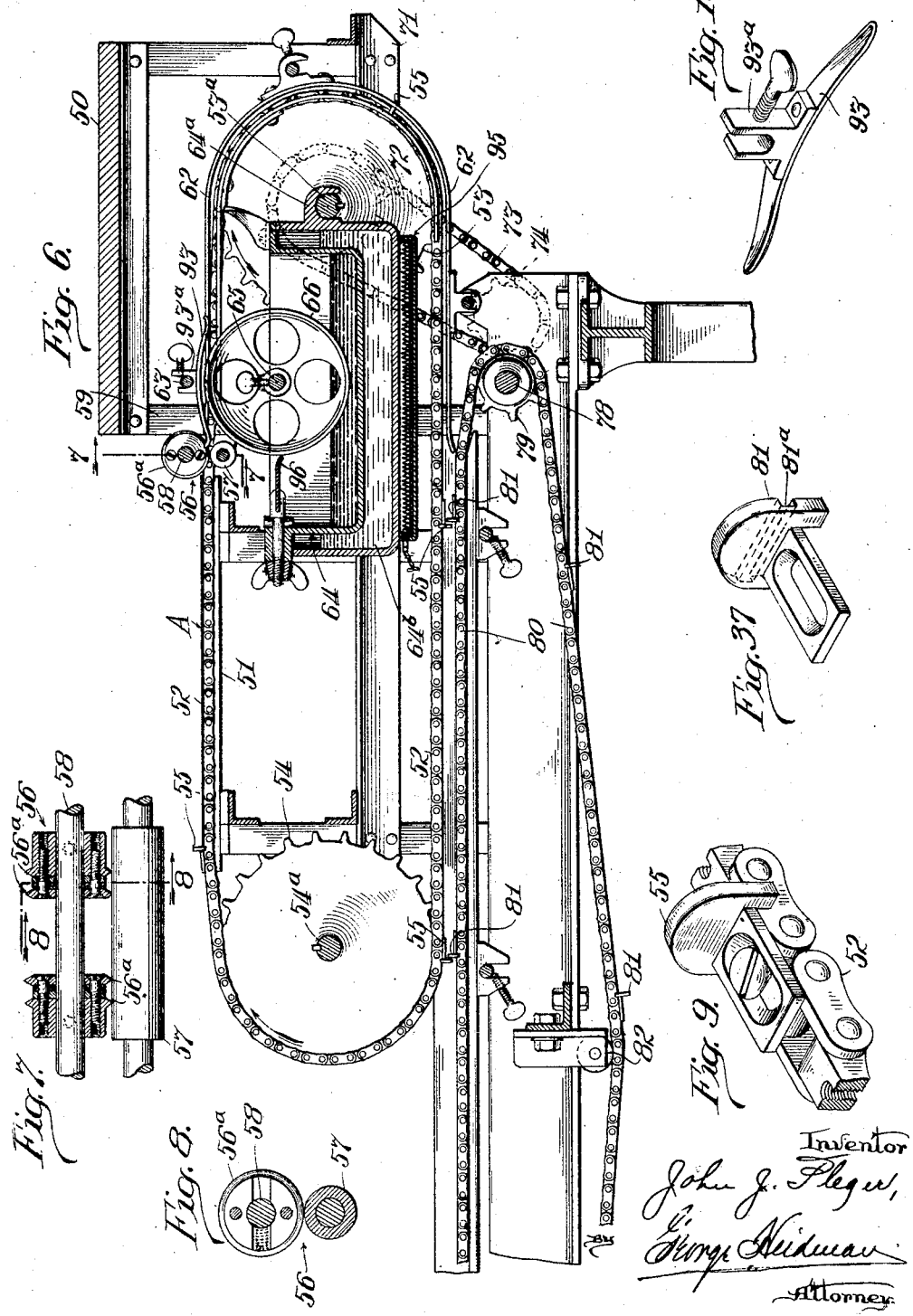

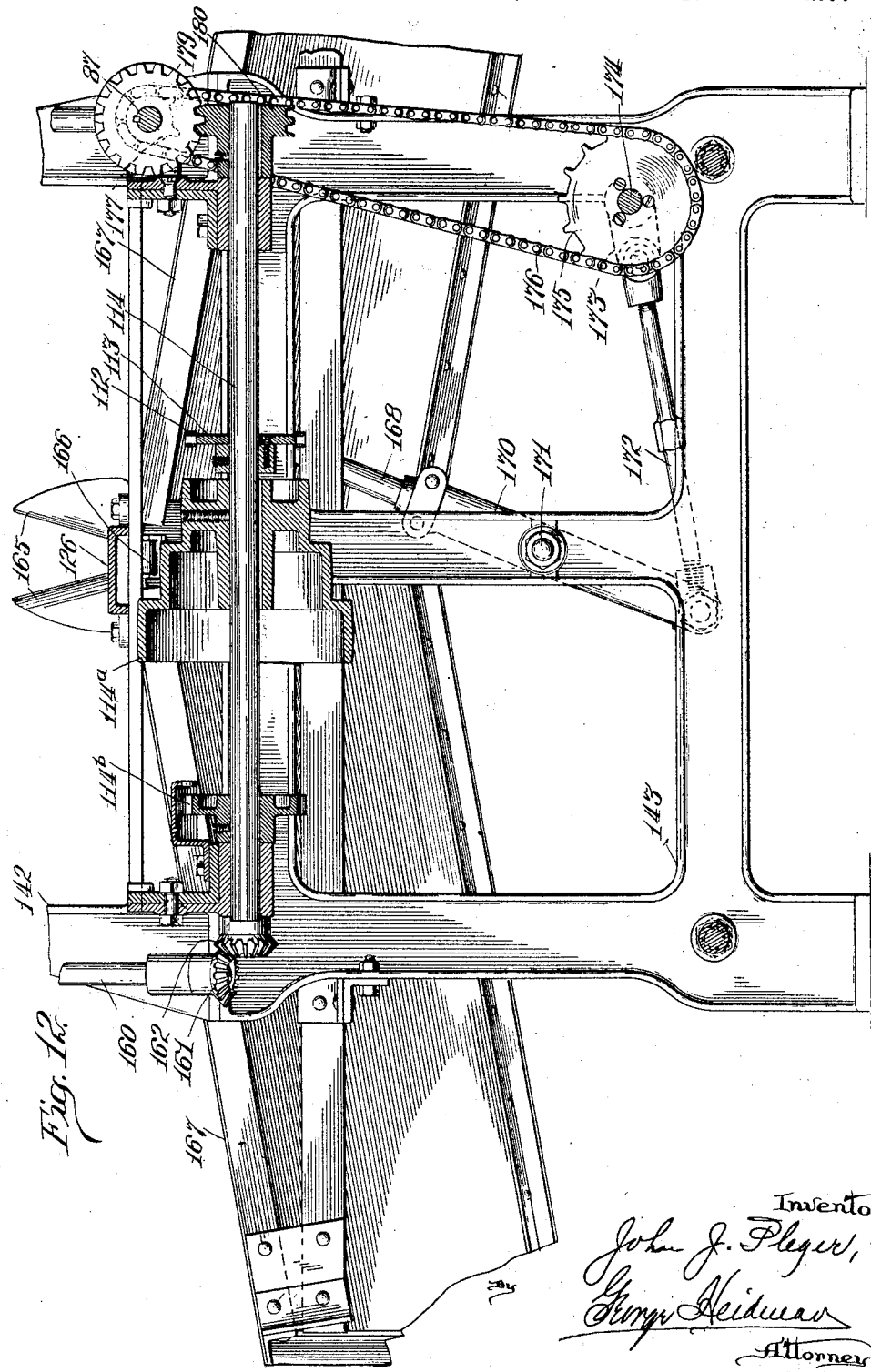

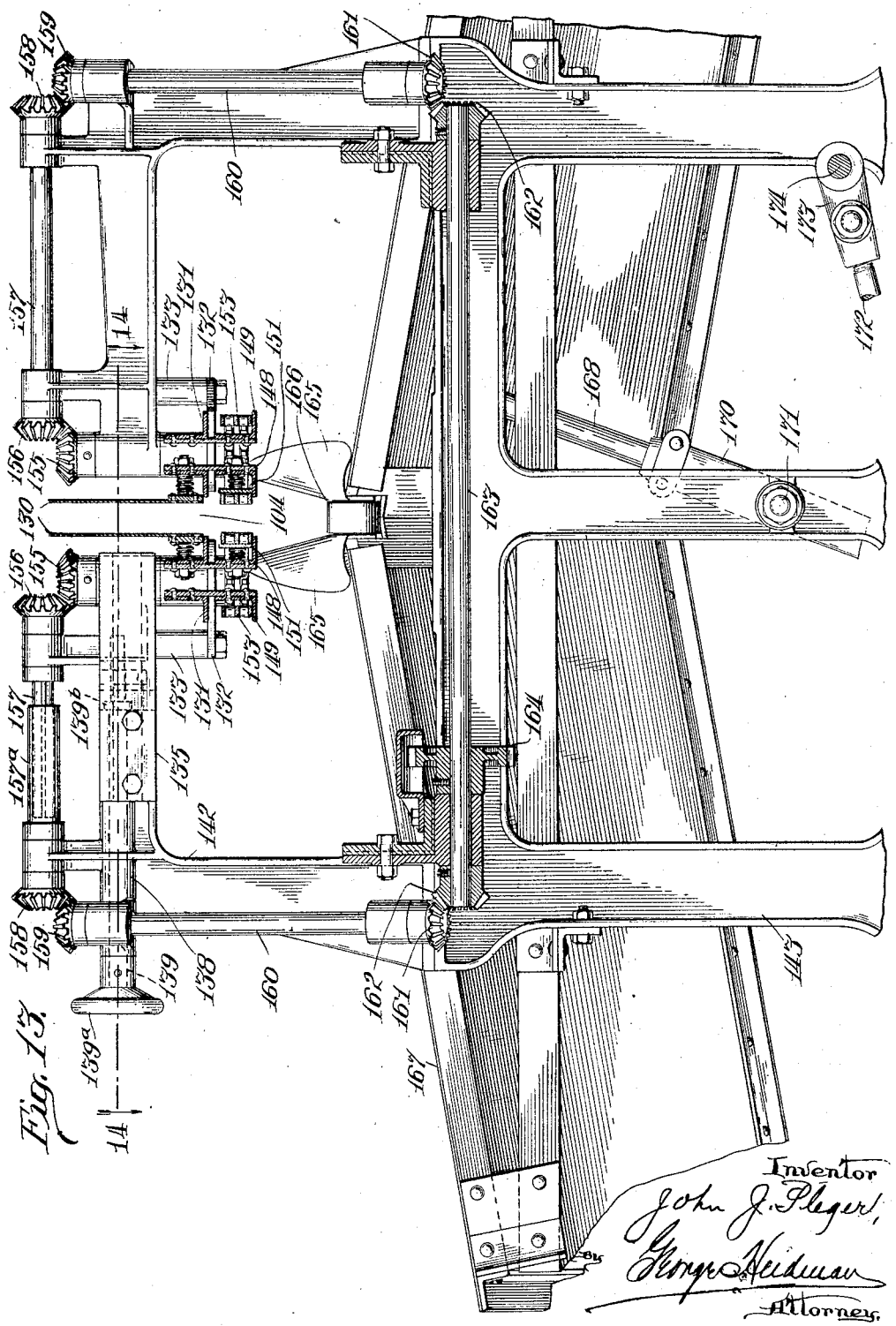

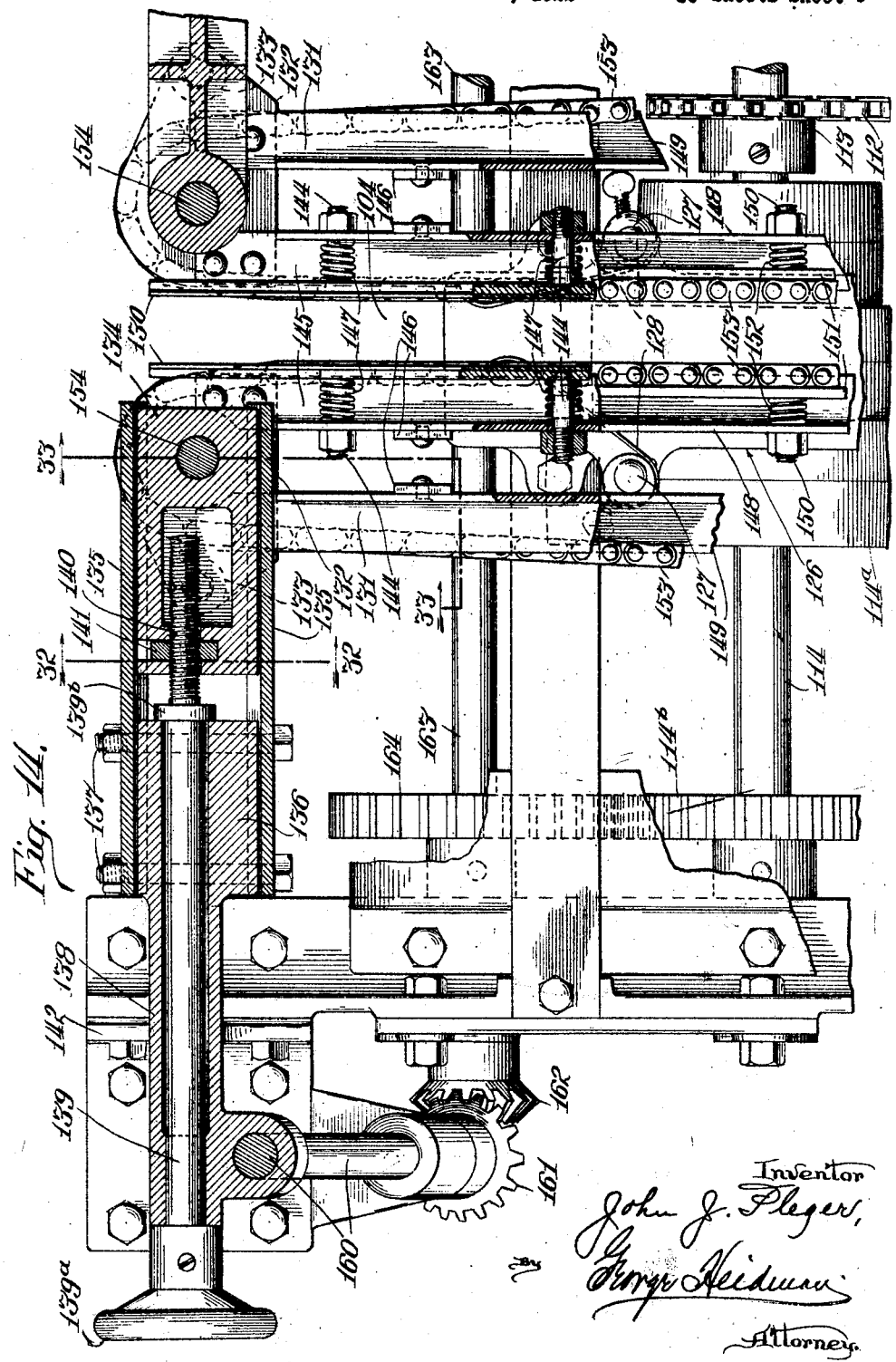

April 14, 1925. 1,533,895
J. J. PLEGER
BOOK OR PAMPHLET COVERING MACHINE
Filed Feb. 4, 1922 16 Sheets-Sheet 10
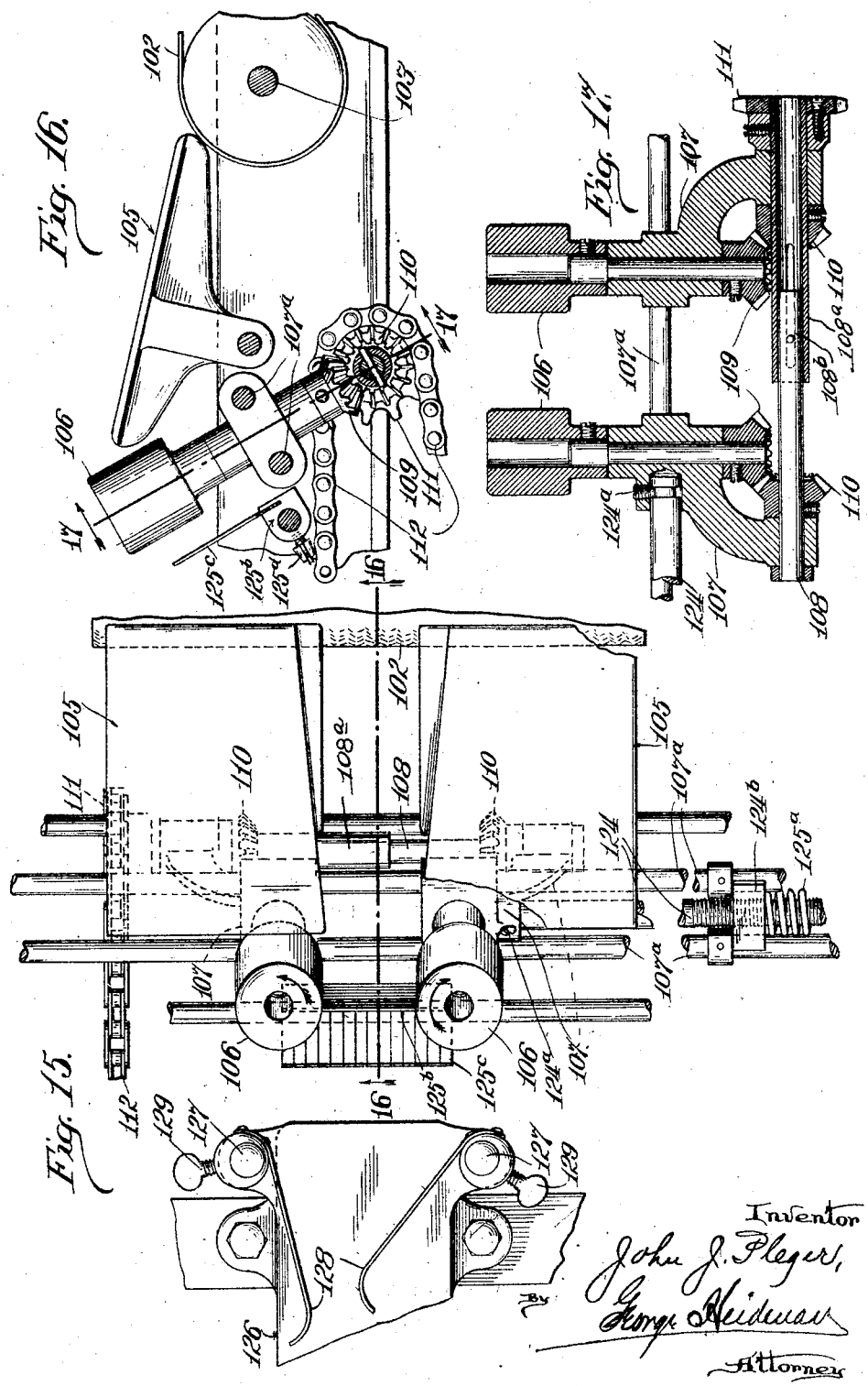

April 14, 1925. 1,533,895
J. J. PLEGER
BOOK OR PAMPHLET COVERING MACHINE
Filed Feb. 4, 1922 16 Sheets-Sheet 11
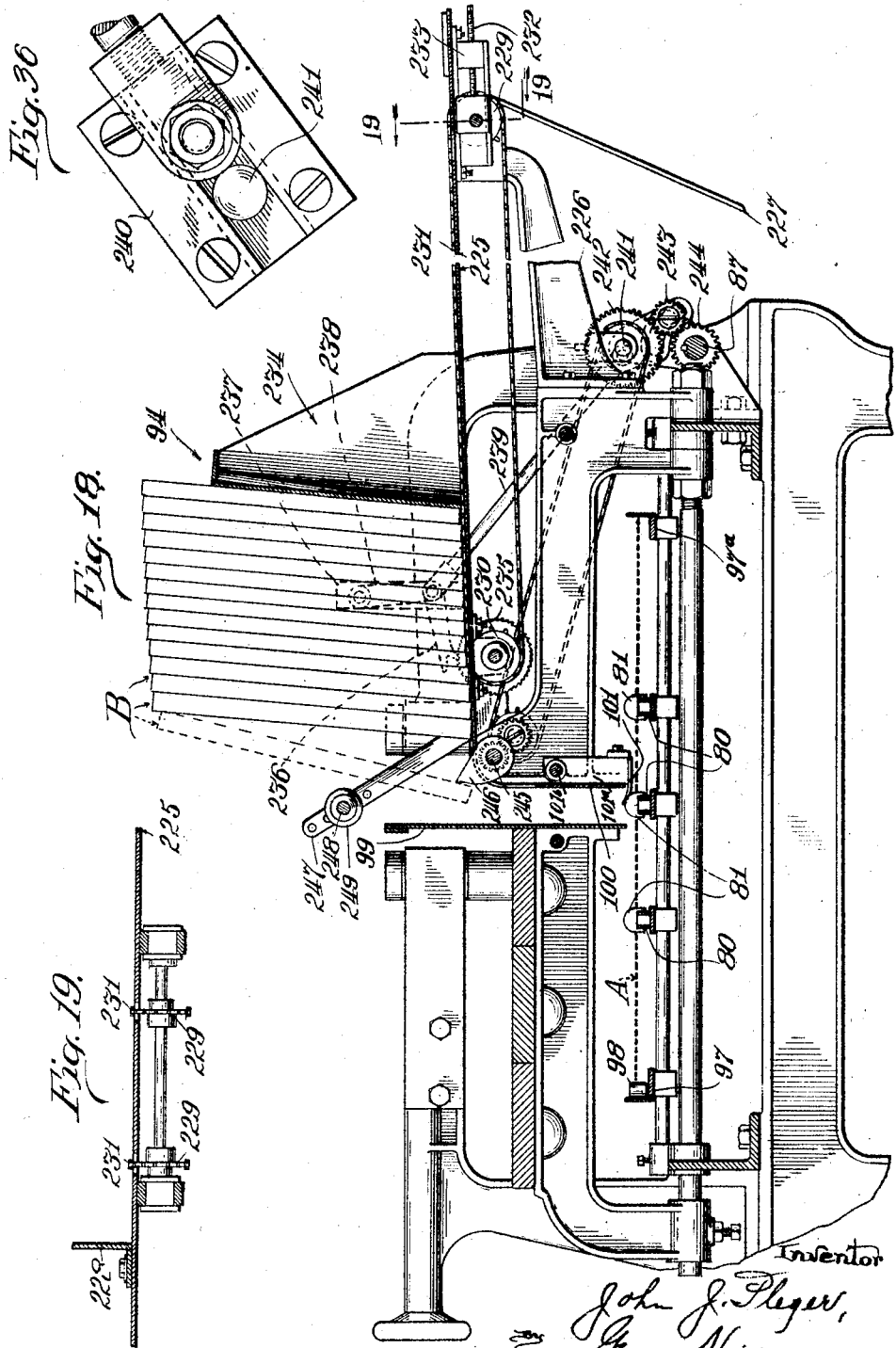

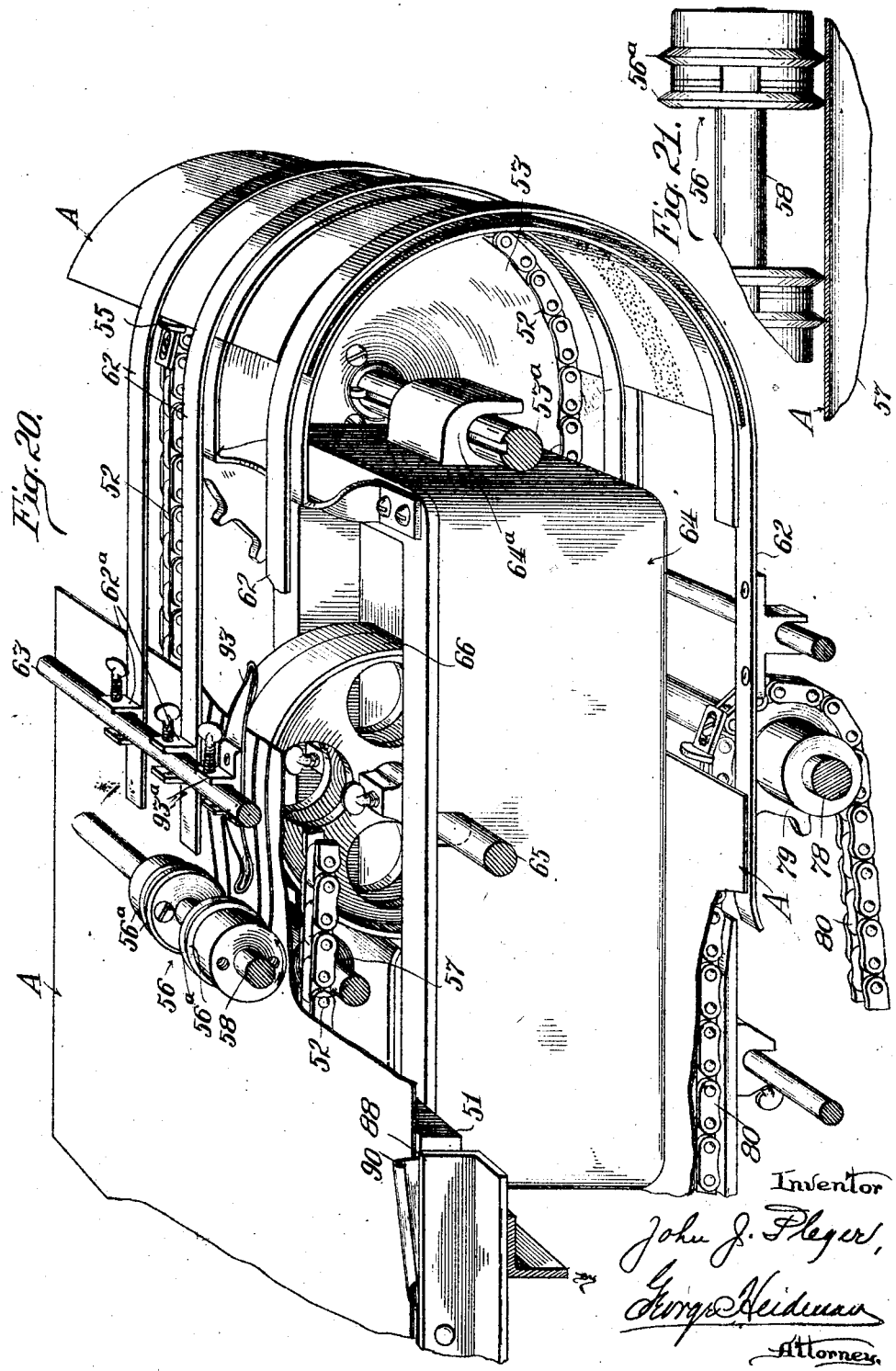

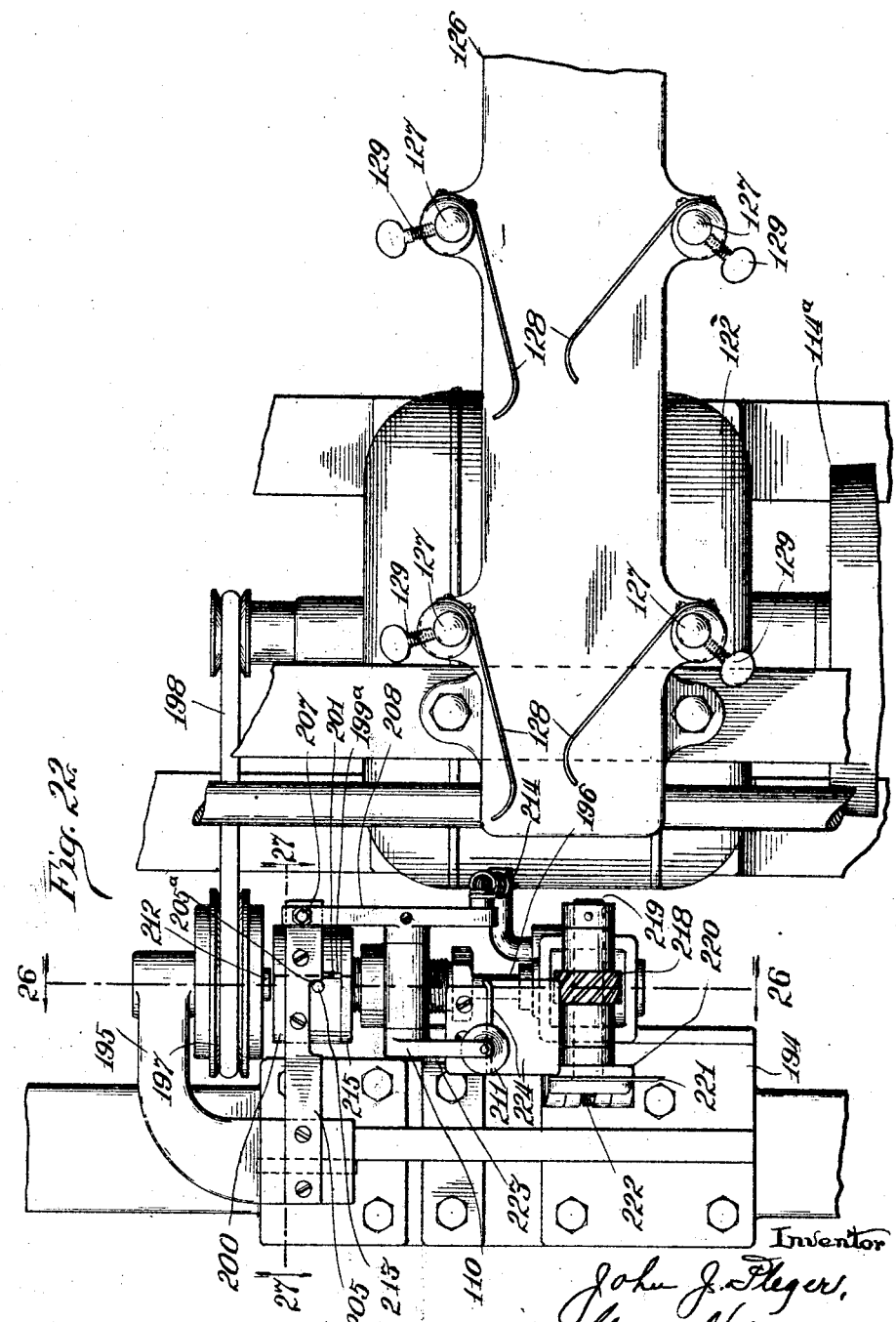

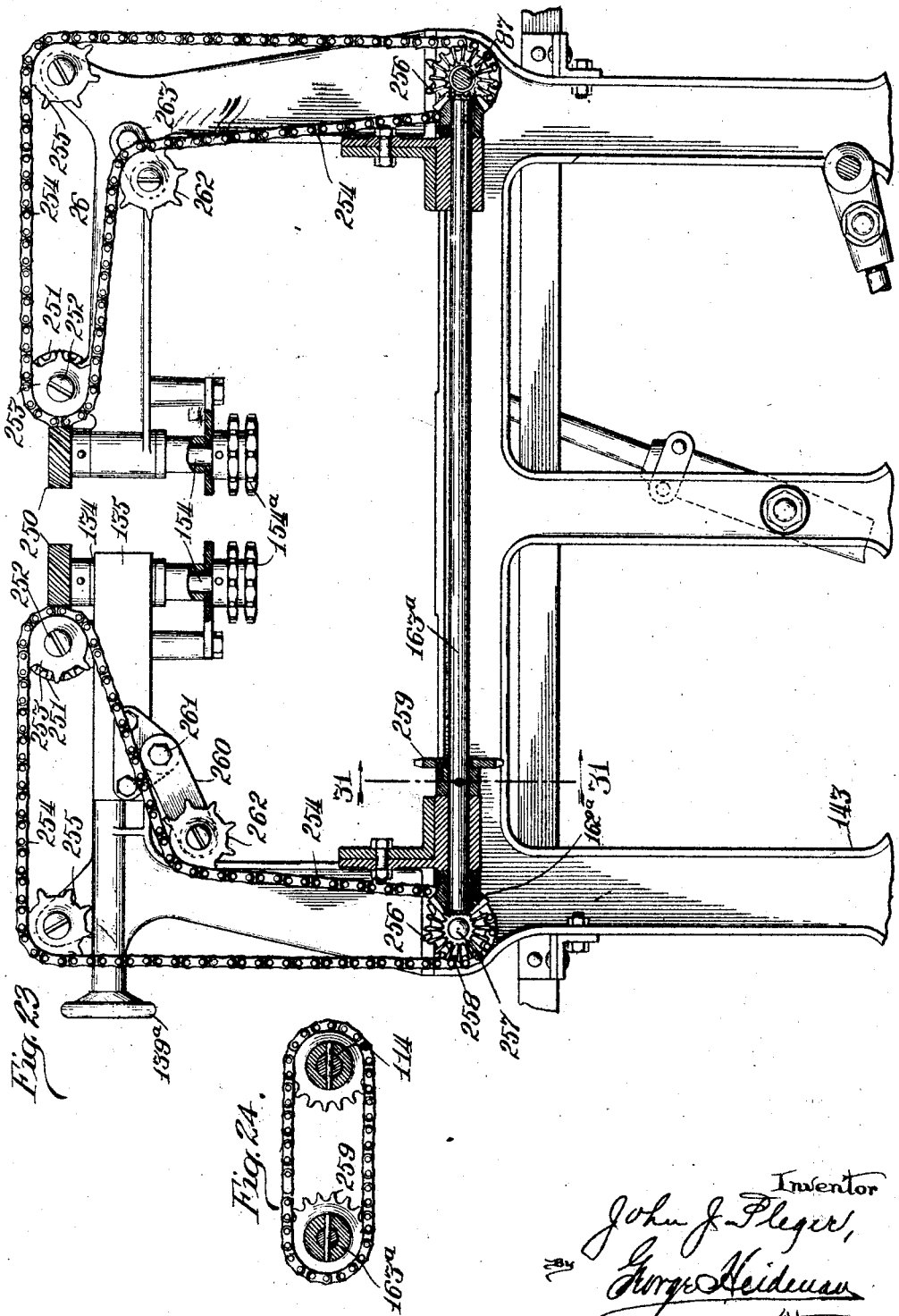

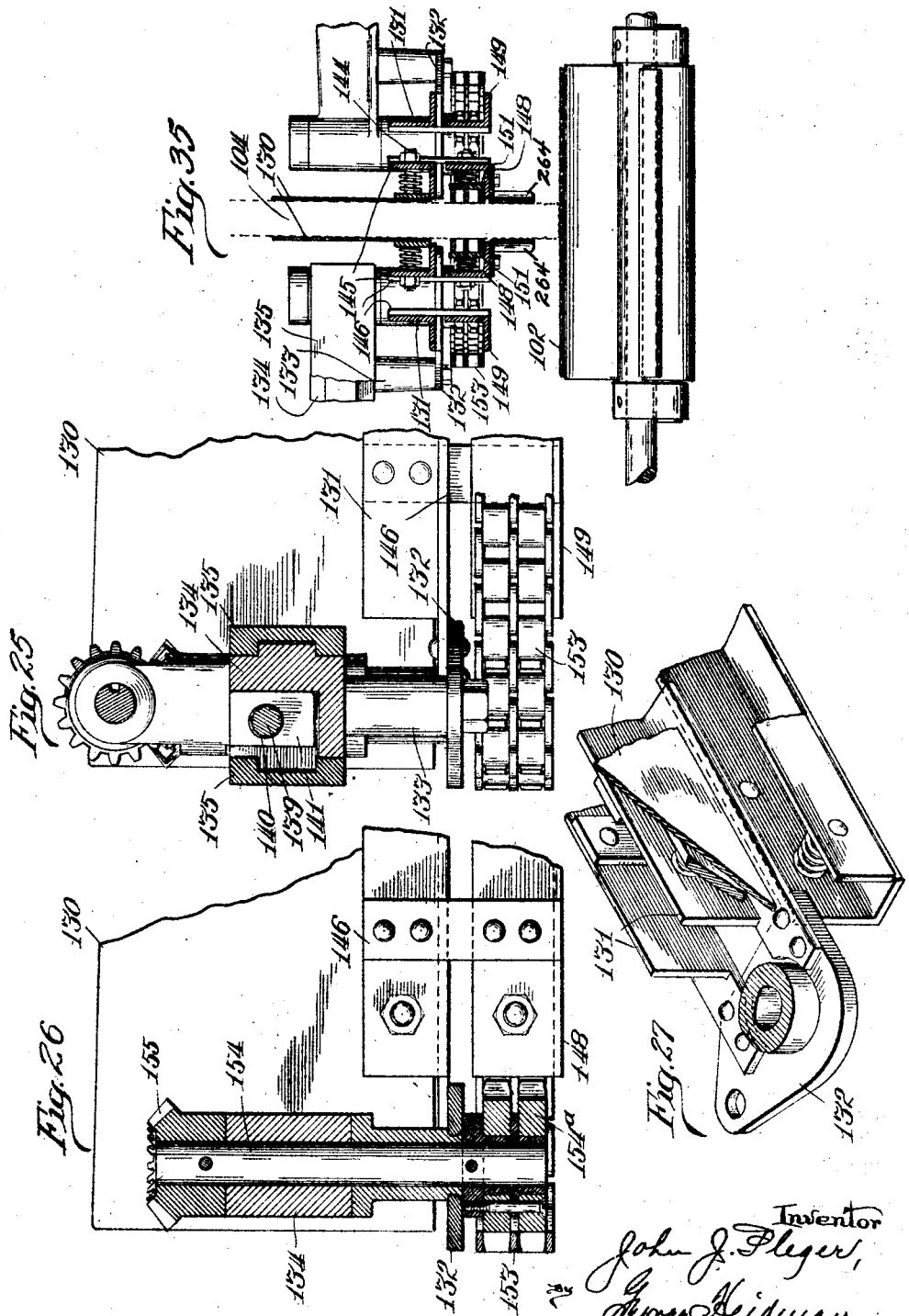

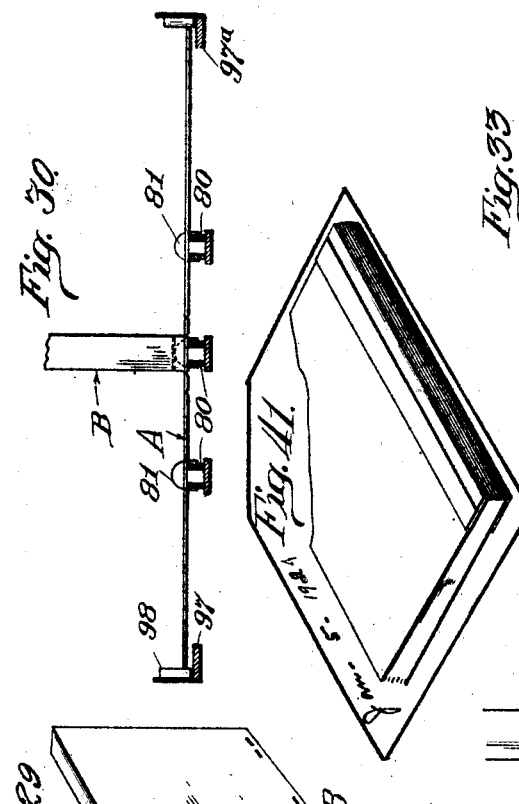
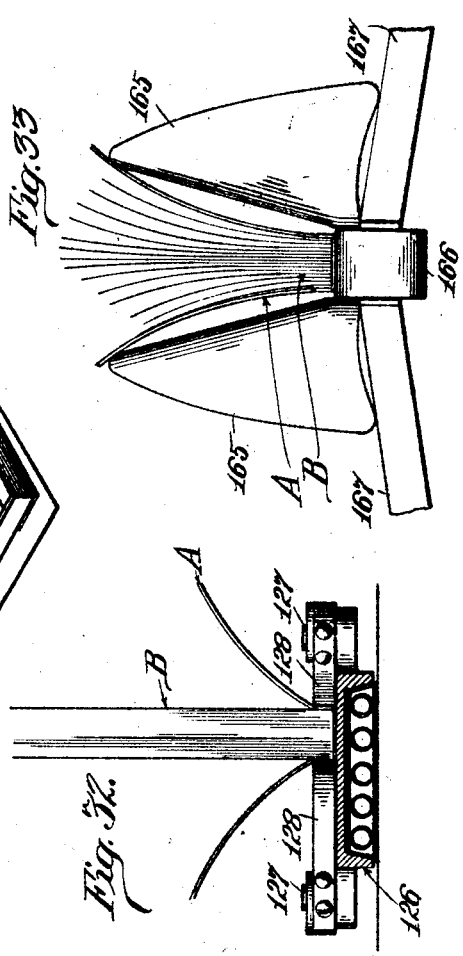
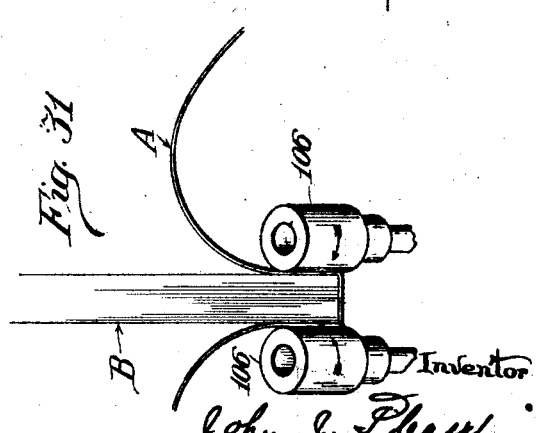
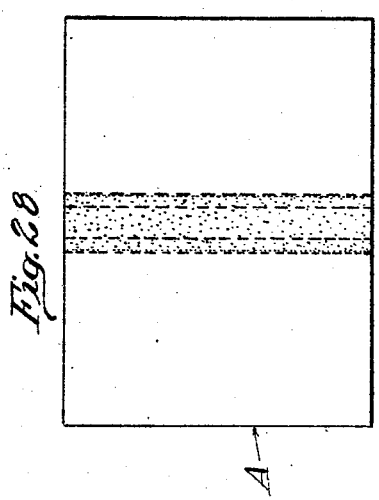

Patented Apr. 14, 1925.

1,533,895

UNITED STATES PATENT OFFICE.

JOHN J. PLEGER, OF CHICAGO, ILLINOIS.

BOOK OR PAMPHLET COVERING MACHINE.

Application filed February 4, 1922. Serial No. 534,101.

*To all whom it may concern:*

Be it known that I, JOHN J. PLEGER, a citizen of the United States, and a resident of Chicago, in the county of Cook and State of Illinois, have invented certain new and useful Improvements in Book or Pamphlet Covering Machines, of which the following is a description, reference being had to the accompanying drawings which form a part of my specification.

My invention relates to a machine for attaching the paper or other flexible cover to a book or pamphlet; the invention having for its object the provision of a single machine whereby the covers, or strips, will be secured not only to the book-back but also a predetermined extent to the sides of the book, to-wit over the stitched or stapled portion adjacent to the back.

One object of my invention is to provide a machine wherein the cover-sheets will be creased or scored in a predetermined manner, commensurate with the thickness of the book or pamphlet and the point of stitching or stapling and the creased or scored portions of the cover-sheet, that is to say the portion of the cover-sheet intermediate of the outer scores or creases, will be automatically provided with glue or adhesive material to such an extent that the cover-sheet will subsequently be made to adhere not only to the back edge of the book or pamphlet, but also to a portion of the sides of the book or pamphlet slightly beyond the point where the book or pamphlet is stitched, with the result that a stronger and more satisfactory article is provided than has heretofore been the case.

My invention also has for its object the provision of a machine wherein the cover-sheet, after being previously scored and given a coating of glue at a predetermined point, is then carried to the book or pamphlet-feeding or introducing portion of the machine, where means are provided for automatically bringing the edge of the book into proper register with the intermediate glued portion of the cover-sheet; the book, with the cover-sheet, being then fed forwardly where the glued portion of the cover-sheet is partially folded upwardly to a predetermined extent into intimate relation with the sides of the book and the glued marginal sides subjected to pressure-applying means adapted to wipe the cover-sheet in an upward direction to cause the glued portion of the cover-sheet to be drawn taught against the rear edge or back of the book or pamphlet in order to not only ensure the glued cover-sheet adhering to the book or pamphlet, but also induce the cover-sheet to have a smooth, taut appearance.

Another object of my invention is to provide means, preferably disposed beyond the means just referred to, relative to the travel of the book, where the glued portion of the cover-sheet will be subjected to the action of a hot-plate or element whereby the glued portions of the cover-sheet will be ironed out and given a smooth finish and appearance.

A further object of my invention is to provide a machine of the character referred to which will be adapted to books or pamphlets of varying thickness, within a given range; wherein the varying cover-sheet and book-engaging elements are readily adjustable and so constructed that books or pamphlets of varying thickness may be successively handled.

A further object of my invention is to provide a machine wherein the cover-sheet carrying elements, or a portion thereof, may be easily adjusted to a condition where the book or pamphlet is to be provided with what is known as an extended cover; means being also provided along the path of travel of the cover-sheet whereby the latter is automatically "centered" and forced into parallel juxtaposition with a straight-edge in order that the cover-sheet will properly register with the rear edge or back of the book.

Another object of my invention is to provide means whereby the books or pamphlets to be covered will automatically be fed into position where the back of the book will be superposed on the glued portion of the cover-sheet.

Another object of my invention is to provide means whereby the attached cover-sheet will be folded or brought upwardly into intimate relation with the sides of the book in advance of its discharge from the race-way of the machine and in advance of its discharge into the receiving hopper or trough which is provided with means whereby the successively covered books or pamphlets will be shifted or directed toward opposite ends or sides of the receiving hopper or trough.

The above enumerated objects and the various advantages of my invention will all be more fully comprehended from the detailed description of the drawings, wherein:—

Figure 1 is a top plan view of the cover-sheet and book-feeding portion of the machine.

Figure 2 is a top plan view of the opposite or discharge end of the machine.

Figure 3 is a side elevation of the cover-sheet and book-feeding end of the machine.

Figure 4 is a side elevation of the opposite or delivery end of the machine.

Figure 5 is a sectional end elevation taken on the line 5—5 of Figure 3 looking in the direction of the arrows.

Figure 6 is a vertical sectional view taken on the line 6—6 of Figure 1 looking in the direction of the arrows.

Figure 7 is a detail sectional view taken on the line 7—7 of Figure 6.

Figure 8 is a detail sectional view taken on the line 8—8 of Figure 7 looking in the direction of the arrows.

Figure 9 is a detail view in perspective of one of the feed chains or elements.

Figure 10 is a detail view in perspective of a cover-sheet controlling element or finger.

Figure 11 is a detail sectional view taken on the line 11—11 of Figure 5 looking in the direction of the arrows.

Figure 12 is a vertical sectional view taken on the off-set line 12—12 of Figure 4 looking in the direction of the arrows.

Figure 13 is a vertical sectional view taken on the line 13—13 of Figure 4 looking in the direction of the arrows.

Figure 14 is a sectional view taken on the line 14—14 of Figure 13 looking in the direction of the arrows.

Figure 15 is a detail view taken on the line 15—15 of Figure 4 looking in the direction of the arrows.

Figure 16 is a sectional view taken on the line 16—16 of Figure 15 looking in the direction of the arrows.

Figure 17 is a detail sectional view taken on the line 17—17 of Figure 16 looking in the direction of the arrows.

Figure 18 is a cross sectional view taken on the line 18—18 of Figure 1 looking in the direction of the arrows.

Figure 19 is a detail sectional view taken on the line 19—19 of Figure 18 looking in the direction of the arrows.

Figure 20 is a perspective view of the cover-sheet scoring and gluing portion of the machine.

Figure 21 is a detail view of portions of the cover-scoring mechanism.

Figure 22 is a top plan view of the hot-plate or ironing mechanism of the machine.

Figure 23 is a sectional elevation of the discharge end of the machine illustrating a modified form.

Figure 24 is a detail sectional view taken on the line 31—31 of Figure 14 looking in the direction of the arrows.

Figure 25 is a detail sectional view taken on the line 32—32 of Figure 30 looking in the direction of the arrows.

Figure 26 is a detail sectional view taken on the line 33—33 of Figure 14 looking in the direction of the arrows.

Figure 27 is a detail view in perspective of one end of the book race-way wall and its supporting means.

Figure 28 illustrates the manner of scoring and gluing the cover-sheet before receiving the book or pamphlet which latter is shown in perspective in Figure 29.

Figure 30 illustrates the position of the cover-sheet and the book or pamphlet when the latter is fed onto the glued portion of the cover-sheet.

Figure 31 illustrates the manner of wiping the glued portion of the cover-sheet upward against the side edges of the book or pamphlet.

Figure 32 is a detail view of the hot-plate or ironing mechanism and illustrates the position of the book or pamphlet with the glued cover.

Figure 33 illustrates the manner of bringing the cover-sheet upward against the sides of the book upon its delivery from the hot-plate end of the machine.

Figure 34 is a detail perspective view of a cover-sheet aligning finger or member.

Figure 35 is a detail sectional view taken on the line 43—43 of Figure 4 looking in the direction of the arrows.

Figure 36 is a detail view of the book-feeding operating rod.

Figure 37 is a detail view in perspective of a cover-sheet engaging finger and tripper of book-holding means.

In the invention, as exemplified in the drawings, the cover-sheets are intended to be manually fed to the machine from a cover-sheet holding support 50 onto the cover-receiving table indicated at 51, which is longitudinally slotted to provide passage for a suitable number of conveying elements or chains 52, 52 arranged to travel about sprocket wheels 53, 53 and 54, 54. The chains are spaced suitable distances apart and each provided with upwardly disposed fingers or lugs 55 adjustably secured to the chains and preferably of the construction more clearly shown in Figure 9. The upwardly disposed fingers or lugs on each chain are arranged at predetermined distances apart, lengthwise of each chain; with the fingers on one chain arranged in alignment with or registering with the lugs or fingers on the other chain so as to simultaneously engage with what may be termed the rear longitudinal side of a cover-sheet, which is indicated at A in Figure 1, when the latter has been placed on the feed-table 51; the lug or fingers being disposed upwardly through the slots in the feed-table 51. The sprocket wheels 53 and 54 are preferably slidably keyed on their respective shafts 53ª and 54ª and the sprocket wheels are held in their proper positions on the shafts by any suitable means. The object in slidably keying the sprocket wheels to their respective shafts is to permit adjustment to cover-sheets of varying size. The cover-sheet A is caused to be moved along with the chains, in the direction indicated by the arrows on the sprocket wheels 53, 54 in Figure 6, beneath the scoring elements or members indicated at 56 in Figures 1, 6 and 20, which preferably consist of discs 56ª see Figure 21 provided with the tapered or beveled circumference so as to provide a more or less penetrating perimeter or edge adapted to sufficiently score the cover-sheet merely on its upper face as it passes beneath the scoring mechanism 56. The cover-sheet is held in proper position by a roller 57 mounted immediately beneath the scoring elements, see Figures 6 and 20; the roller 57, at least at a point immediately beneath the scoring elements 56, being preferably of brass or other suitable metal of a somewhat softer nature than the steel discs 56ª. The scoring discs 56ª are spaced predetermined distances apart by suitable rollers or rings in order that the scored portions of the cover-sheet may be in keeping with the thickness of the book or pamphlet and in keeping with the distance of the stapled or stitched portion of the book relative to the back, in order that the outside scores will be disposed at a point on the cover-sheet slightly beyond the stitched or stapled portion of the book or pamphlet. The scoring elements 56 are secured to a shaft 58 to rotate therewith and this shaft is rotatably mounted in brackets or standards 59 secured to the main frame of the machine; with one end of the shaft 58 disposed beyond the supporting bracket or frame 59 and provided with a sprocket as at 60 in Figure 5 which receives a sprocket chain 61 whereby shaft 58 is constantly rotated when the machine is in operation. The scoring elements are, of course, arranged adjacent to the center of the cover-sheet and therefore are disposed intermediate of the conveying chains 52, thus permitting the conveying chains to pass beneath the scorer or disc-carrying shaft 58, enabling the cover-sheet to continue in its travel and be carried between a series of guide members, indicated at 62 see Figures 1, 6 and 20, of which a suitable number are employed, arranged in pairs and at spaced distances apart laterally of the machine, arranged to provide upper and lower guides, preferably in the nature of bent metallic strips; some of which are adjustably secured as at 62ª to a rod 63 disposed transversely of the machine and suitably secured in place; while the lower guide strips or members are shown secured to or carried by a glue-pot 64 disposed beneath the upper strands of the feed-chains, namely in a plane beneath that of the scoring elements.

The glue-pot 64 is preferably removably secured in place by having one end secured to a suitable member of the machine frame at a point beneath the feed-table 51, while the opposite end is shown provided with a lip or lug as at 64ª adapted to hook over the sprocket shaft 53ª, see Figures 6 and 20. The glue-pot 64 is formed for the passage of a shaft 65 which is provided with a glue-roller 66 secured to the shaft so as to rotate therewith; the glue-roller being preferably composed of a series of discs having wide flanges or peripheries adjustably keyed to the shaft 65 by thumb screws 66ª as shown in Fig. 20, thus enabling the addition or removal of discs so as to provide a glued surface, on the cover-sheet, of the desired width and in keeping with the distance between the outer scores formed by the scoring elements 56. The outer end of the shaft 65 is shown provided with a sprocket as at 67 adapted to receive a sprocket chain 68 which takes about a sprocket wheel 69 secured to one end of the shaft 53ª on which the sprocket-wheels 53 are mounted; the shaft 53ª being suitably mounted as at 70 on the supporting frames 71 arranged at opposite sides of the machine. The outer end of the shaft 53ª is provided with a sprocket wheel 72 about which a sprocket chain 73 is disposed, which chain also extends about a sprocket 74 mounted on a stub-shaft 75 provided with a pinion 76 which meshes with a pinion 77 on the shaft 78 provided at predetermined points with the sprocket wheels 79, 79, 79. The sprocket wheels 79 are adapted to receive a second set of conveyor chains 80, arranged to travel in a slightly lower horizontal plane than the conveyor chains 52. The conveyor chains 80 are also provided with cover-engaging fingers or lugs 81; with the lugs on the two outside chains 80 being substantially similar to the engaging lugs 55 shown in detail in Figure 9 and secured to the conveyor chains 52; while the lug on the intermediate chain 80 is preferably provided with a slight under-cut portion at the lower side, at 81ª, see Fig. 45, in order to permit the adjustment of said lug on the intermediate chain without affecting the cover-sheet relative to the lugs on the two outside chains and for a purpose later to be described. The conveyor chains 80 are disposed lengthwise of the machine to a predetermined point and are shown disposed about a tension-regulating roller or member as at 82 in Figure 6 which is adjustably secured to one of the side members of the supporting frame so that the roller may be adjusted in a vertical direction. The conveyor chains 80 lead from the sprocket wheels 79 about sprocket wheels 83 secured on a shaft 84 disposed transversely of the machine. The outer end of the shaft 84 is provided with a bevel gear 85 which meshes with a bevel gear 86 secured to the end of a driven shaft 87, see Figure 1.

In order that the cover-sheet may be properly centered when placed on the feed-table 51, I provide the latter with guide members 88 and 89, see Figure 1; the guide members being preferably shown in the nature of angle bars which may be adjustably secured to cross members of the frame of the machine. The member 89 constitutes a straight-edge for the cover-sheet; while the member 88 is preferably provided with a plurality or spring plates or fingers 90 each secured at one end to the member 88, while the free end is preferably curved and bent outwardly to engage with the edge of the cover-sheet. The members or fingers 90 are formed of thin flexible metal so as not to apply too great a pressure on the edge of the cover-sheet but a sufficient pressure to maintain the opposite edge of the cover-sheet flush with the guide member or straight-edge 89; a sufficient number of members or fingers 90 being employed to engage with the cover-sheet at various points to induce the condition just mentioned. The construction of the elements or fingers referred to is more clearly shown in Figure 42.

The scorer shaft 58 is provided with a pinion 91 which meshes with a small pinion on the shaft 57 and the outer end of the shaft 58 is provided with the sprocket 60 which receives the sprocket chain 61 which in turn passes about a sprocket 92 secured to the end of the shaft 78 opposite to that which is provided with the pinion 77, so that power will be transmitted from shaft 78 to the scorer shaft 58 and from the latter through the pinion described, to the cover-sheet holding shaft or roller 57.

The cover-sheet after passing beneath the scorers 56 is passed over the glue-applying roller 66 and is held downward in more or less firm contact therewith by means of the adjustable finger or member 93 secured to the rod 63, see Figures 1, 6, 20 and shown in detail in Figure 10. The member 93 is removably held in place by suitable clamping means as at 93ª and has the forward end preferably curved slightly upward, namely at a point adjacent to the scorers; the entire member slightly curved to conform somewhat to the glue-applying roller 66 to cause the cover-sheet to be held onto the glue-roller and ensure a sufficient and uniform application of glue or adhesive substance. The feed-chains 52 and the guide members 62 are adapted to feed the cover-sheet from the feed-table 51, beneath the scoring element, thence over the glue-roller and through a path which lies beneath the glue-pot.

The upper strands of the conveyor chains 80 are intended to travel in the same direction as the lower strands of the conveyor chains 52 and are arranged adjacent to the guides 62 so that the cover-sheet, indicated at A, will be discharged onto the lower set of conveyor chains 80 and engaged by the pusher members or fingers 81, causing the cover-sheet (which has previously been scored and supplied with glue) to be conveyed to a point beneath the delivery end of a book-feeding mechanism indicated in a general manner at 94 whereby the books are fed with the back-edge downward; the specific construction and operation whereof will later be described.

In the particular exemplification of my invention, the glue-pot 64 is provided with a water-chamber 64ᵇ, while the bottom of the glue-pot is provided with an electric coil or heater, as indicated at 95 in Figure 6, whereby the glue is maintained in proper condition. The glue-pot, at a suitable point, is shown provided with a scraper-blade 96, see Figure 6, adjustably secured in place in order that its relation to the glue-roller 66 may be regulated and an even distribution or film of glue on the glue-roller obtained before the glue applying roller contacts with the scored portion of the cover-sheet A.

The conveyor chains 52 and 80 cause the cover-sheet to be brought onto a guide-frame shown at 97 and 97ª, see Figure 18, which is disposed lengthwise of the machine to a predetermined extent and which is also preferably shown in the nature of properly spaced angle-irons or bars. The guide member 97 is also preferably provided with flat flexible spring members or fingers 98 disposed inwardly to engage with one edge or side of the cover-sheet, to cause the latter to lie flush with the guide member 97ª. The machine at the discharge end of the book-feeding mechanism 94 is provided with a book-receiving passage formed by the vertically disposed plates 99 and 100, see Figure 18; with the plate 99 secured to adjusting mechanism later to be described, whereby the plate 99 may be moved transversely of the machine, to a predetermined extent and therefore into predetermined spaced relation with the plate 100, so as to provide passage for books or pamphlets of varying thickness. The plate 100, at its lower edge, has an oscillatably mounted book-holding member or trip-plate, shown at 101, onto which a single pamphlet or book is fed before it comes into contact with the cover-sheet. The passage-way, intermediate of the plates 99 and 100, is arranged at a point immediately above the scored and glued portion of the cover-sheet A, so that the book or pamphlet held by the trip-plate 101 will be in proper aligned position to contact with the glued portion of the cover-sheet when the latter has been brought into place by the conveyor chains 80. The forward edge of the trip-plate or member 101 is adapted to be engaged by a pusher lug or finger 81 arranged on the intermediate conveyor chain 80 and the trip-plate is so pivoted that it will be moved about its pivotal point and from beneath the back of the book or pamphlet, thereby causing the book or pamphlet to drop down onto the glued portion of the cover-sheet while the latter is traveling beneath said passage-way. The trip-plate 101 is secured to the lower end of the arm $101^a$ (see Figure 18) which latter is pivotally mounted at its upper end as shown in Figure 18 at $101^b$ so as to cause the trip-plate 101, through the action of gravity, to swing into normal position, namely into the passage between the plates 99 and 100 and therefore into the path of the dropping book, as shown Figure 18 so that the book will be held above the advancing cover-sheet. The end of the trip-plate 101, disposed toward the approaching cover-sheet, is preferably curved or beveled (see Figure 1) so as to have sliding relation with the advancing pusher lug or finger 81 which causes the plate 101 to swing from beneath the wall plate 100 where it is held until the fingers 81 and book have traveled beyond the other end of the plate allowing the latter to swing back to normal position.

The cover-sheet in its flat or opened-out condition, with the back of the book in place on the glued portion thereof is carried by the conveyor chains 80 onto an endless element or belt 102, shown in Figure 4, disposed about suitable rollers mounted on stub-shafts 103, 103, while the book, in its vertically disposed position, passes into a passage or race-way 104 formed by elements later to be described. The cover in its flat opened-out condition will be engaged on its lower side by a delta wiper comprising a pair of inclined flaring members or wings 105, 105 which are curved to wipe the glue into the crevices between the folios and to gradually bring the cover-sheet upward adjacent the sides of the book or pamphlet, thus causing the glued portion of the cover-sheet which extends beyond the back of the book, to be brought upwardly into juxtaposition with the stitched or stapled sides of the book or pamphlet; the wiper-wings 105 being curved or flared and inclined to gradually bring the cover-sheet upward without injury. The book with the glued portion of the cover-sheet partially brought upward against the sides is then caused to travel intermediate of a pair of rollers 106, 106, see Figures 15 and 16; the rollers 106 being secured to short inclining stub-shafts suitably journalled in supporting brackets 107 which are loosely mounted on a transversely disposed extensible shaft 108 which comprises a hollow or sleeve portion $108^a$ having slot and pin connection as shown at $108^b$ with the other shaft portion 108 (see Figure 17) so as to rotate together while permitting distention or telescoping of the shaft portions. The lower end of each roller stub-shaft is provided with a bevel pinion 109 which in turn is arranged in meshing relation with the bevel gears 110 secured on the transversely disposed shaft portions 108 $108^a$. The end of shaft portion $108^a$ is provided with a sprocket wheel 111 about which a chain 112 is disposed and this chain also extends about a sprocket 113 on a pulley shaft 114, see Figure 4. The pulley shaft 114 is preferably provided with a stepped pulley, or a plurality of pulleys $114^a$, to receive a belt 115 which extends from and is disposed about a pulley 116 secured on a shaft 117 mounted in a suitable bracket or supporting frame 118, see Figure 4. The supporting bracket or frame 118 is also shown provided with a shaft 119 which in turn is provided with a pulley 120 to receive a belt 121 which leads from the armature shaft of a motor indicated at 122. The ends of the shafts 117 and 119 are each provided with sprocket wheels to receive a drive-chain 123 whereby power is transmitted from shaft 119 to shaft 117 and by means of belt 115 to shaft 114 and thence through chain 112 to sprocket 111 on shaft 108 provided with the bevel gears 110 whereby power is transmitted to the bevel gears 109 at the lower end of the stub-shafts or journals of the rollers 106. As the bevel gears 110 are located at opposite sides of the bevel gears 109, it is evident that the rollers 106 will be caused to rotate toward each other as viewed from the left in Fig. 15; which rotation, in the particular exemplification of the invention, is in a direction opposite to the direction of travel of the book with its cover-sheet so as to apply an upward wiping effect on the lower sides of the cover-sheet, namely at the sides provided with the glue or adhesive substance. These rollers cause the glued portion of the cover-sheet to be drawn taut against the back and stitched or stapled portion of the book or pamphlet.

As a means for properly supporting the wiping rollers 106, 106, I provide the transversely disposed guide rods 107ª, 107ª, see Figures 2 and 15, which are shown extending through the bracket members 107 of each roller 106; the guide rods with the bracket members 107 being arranged so as to preferably maintain the wiping rollers in the upwardly inclining position more clearly shown in Figures 4 and 16, whereby the rollers may exert a more or less gradual, upward wiping pressure on the cover-sheet and will cause the cover-sheet to be drawn taut about the rear edge of the book or pamphlet.

In order that the wiping rollers may be positioned relative to each other, at sufficient distances apart to accommodate books or pamphlets of varying thickness, the bracket-holding portions thereof, at least of one of the rollers, is provided with a control rod 124, the end whereof is disposed in a socket in bracket member 107. The control rod 124 is shown grooved to receive a set-screw 124ª, see Figure 17, whereby the rod 124 is rotatably held in the socket of bracket 107.

The outer end of rod 124 is threaded and passes through the tapped opening in a member or cross-piece 124ᵇ, see Figure 2. The cross-piece 124ᵇ is shown slidable on the guide rods 107ª to a predetermined extent; while the end of control rod 124 passes through an enlarged non-threaded opening in the side frame of the machine and is free to move longitudinally so far as the side frame is concerned. The outer end of control rod 124 is shown provided with a hand-wheel or grasp at 125, whereby control rod 124 may be rotated and thereby screwed either farther into or out of cross-piece or member 124ᵇ.

The cross-piece 124ᵇ is free to slide lengthwise of the guide-rods 107ª, 107ª in a direction toward the adjacent side frame of the machine, while inward movement thereof beyond a predetermined point is prevented by suitable stop lugs or pins secured to the guide-rods 107ª, 107ª which will limit the inward movement of control rod 124 and therefore of the correlated wiping roller 106 so as to maintain a minimum spaced relation between the two rollers 106.

The control rod 124 is shown provided with a coil spring 125ª, mounted intermediate of the side frame and the cross-piece or member 124ᵇ adapted to force the control-rod 124 with cross-piece 124ᵇ toward the longitudinal center line of the machine, with the result that the control-rod with its correlated roller 106 is yieldingly maintained in its adjusted position relative to the opposite roller 106,—namely either farther from or closer to the other roller,—while at the same time permitting the one roller to yield, regardless of its normal position and thereby compensate for any slight variations that may occur in the thickness of books or pamphlets of a given size.

At a point in the book-raceway, preferably just beyond the wiping rollers 106, I provide means for producing a yielding upward pressure against that part of the cover-sheet disposed about the rear edge of the book or pamphlet, in order that the respective portions of the glue-supplied part of the cover-sheet, transversely of the rear edge of the book or pamphlet, may be forced into intimate relation with the various sections or stitched or stapled portions of the book or pamphlet; the means just referred to being especially adapted to books or pamphlets where the respective sections thereof have not been uniformly aligned or evenly stitched in place.

This pressure-applying means is shown preferably consisting of a suitable sleeve 125ᵇ mounted on a suitable cross-rod disposed from side frame to side frame of the machine, see Figures 2, 4 and 15, and the sleeve is shown provided with a thin and more or less resilient metallic or steel plate 125ᶜ slit at predetermined and equi-distances apart to provide a multi-digitated element or plurality of comparatively narrow fingers or portions; the respective portions or digits being of such width as to independently exert pressure on adjacent portions of the adhesive supplied portion of the cover-sheet at the rear edge of the respective book sections.

In order that the degree of pressure may be regulated according to the nature of the cover-sheet and work operated on, the sleeve member 125ᵇ is preferably made adjustable and therefore is shown held on the guide-rod in its adjusted position by means of a suitable thumb-screw as at 125ᵈ; the multi-digitated member being preferably arranged at more or less of an inclination, in the direction of travel of the book or pamphlet, so as to permit the book or pamphlet with its cover-sheet to ride across the free ends or tips of the respective portions or digits of the member or steel brush 125ᶜ without injury to the cover-sheet. As is evident from the construction shown, the pressure exerted by the different fingers or portions of the steel brush will force the glue into the various crevices of uneven or jagged book-sections at the rear stapled edges thereof.

The book, with the cover partially held up against the sides through the action of the rollers 106, is conveyed onto heated smoothing means in the nature of a hot-plate 126, a top plan view of which is shown in Figure 22. The hot-plate 126 is preferably considerably longer than the books operated on and of width greater than the race-way 104 through which the book or pamphlet with the cover-sheet travels, in order that adjustments, laterally of one of the walls of the race-way, may be made for books or pamphlets of varying thickness. The hot-plate may be of any suitable construction, having a smooth upper surface and preferably electrically heated. The hot-plate, at opposite longitudinal sides, is provided with short studs as at 127, to which are secured flat spring wiper-blades 128, preferably provided with curved free ends adapted to press against the glued side of the cover-sheet. The wiper elements or blades 128 are adjustably secured to the studs 127 as clearly shown in Figure 22 in order that they may be adjusted to books of different thickness and also have firm or a pressing contact with opposite sides of the cover. As the wiper elements are of metal and in intimate relation with the top of the hot-plate 126, they will also be heated and therefore be more effective on the glued sides of the cover and perform the same function as the main part of the hot-plate, namely to smooth or iron out the glued portions of the cover; causing the glue to spread into any crevices or interstices and provide the book with a smooth back and side edge, uniformly glued throughout. The wiper-blades 128 are shown adjustably secured in place by means of suitable thumb-screws 129 see Figure 22.

The book race-way, at the end of the machine last referred to, namely the end provided with the wiper-rollers 106 and the hot-plate 126, preferably consists of vertically disposed plates 130 arranged in spaced relation and properly supported by a suitable framework comprising the angle members 131, 131 which are supported by small plates 132 (see Figure 34) which, at least on one side of the machine, are mounted on studs 133 carried by blocks 134 slidably mounted in a laterally disposed frame 135. The frame 135 is shown provided with a block 136, see Figure 14, stationarily secured to the frame by means of bolts 137 against movement. The blocks 136, at opposite ends of the aforesaid race-way and on the same side of the machine, are each provided with a sleeve portion 138 through which a spindle 139 extends; the outer end of the spindle 139 being provided with a suitable hand-wheel as at 139ª whereby to rotate the spindle; while the inner end is flanged at 139ᵇ and threaded as shown at 140. The threaded end passes through an opening in block 134 which is socketed to receive a nut or washer 141 through which the threaded end of the spindle also passes. The elements and constructions just referred to, it is understood, are duplicated on the same side of the machine, to-wit at both ends of the last mentioned race-way 104, namely that part of the machine beyond where the book or pamphlet is fed onto the glued cover-sheet, as shown in Figure 2. The construction just referred to, however, merely relates to one side of the machine in order that one side wall of the race-way may be adjusted laterally to books of different thickness; the plate 130 on the opposite side of the machine being stationarily held in any suitable manner on the frame of the machine. The machine is provided with vertically disposed brackets or members 142 (see Figure 4) for supporting and carrying the race-way mechanism just described; said brackets or supports being in turn suitably secured to the supporting standards 143 of the machine.

The race-way forming walls or plates 130 are shown supported by short studs or bolts 144, see Figures 13 and 25, which extend through an inner set of angle members or plates 145, preferably supported by the plates 132. The bolts 144, a suitable number of them being disposed throughout the length of the race-way, are each provided with a spring 147, while the outer ends of the bolts 144 are each provided with a nut and slidably held by the angle-bars 145 as shown in Figure 25. With this construction, it is apparent that the race-way walls or plates 130 are yieldingly held in their maximum outward or normal position through the action of the springs while at the same time being adapted to yield slightly to adjust themselves to any slight differences in thickness or unevenness in books or pamphlets of a given size.

Supported beneath the plate 132 by straps 146 are a pair of angle bars or members 148 and 149, see Figure 25; the angle bars or members 148 being provided with short studs 150 loosely mounted therein to yield lengthwise of the studs. The inner ends of the studs are provided with a vertically disposed plate 151 which is yieldingly held outwardly in normal position by means of a short spring 152 mounted on each stud 150. The angle members or bars 148 and 149 provide a run-way for a suitable chain 153, disposed vertically so as to rotate about suitable sprockets having vertically disposed axes and located at opposite ends of the race-way 104. The mechanism for driving the chains 153 (one being disposed on each side of the race-way as clearly shown in Figures 2, 4 and 25) comprises the stub-shafts 154, which are substantially similar to the studs 133, except that the upper ends of the stub-shafts 154 are each provided with a gear 155 each arranged in mesh with a bevel gear 156 mounted on the horizontally disposed short shafts 157, 157 disposed toward opposite sides of the machine, while the outer ends of the shafts 157 in turn are each provided with a bevel gear 158 arranged in mesh with a bevel gear 159 secured to the upper end of the upwardly disposed shafts 160, 160 on opposite sides of the machine. The lower ends of the shafts 160, 160 are each provided with a bevel gear 161, arranged in mesh with bevel gears 162, 162 mounted on the ends of a drive shaft 163 which is provided with a gear 164, which meshes with a gear 114$^b$ on pulley or main drive shaft 114.

In order to permit the one side of the raceway to be laterally adjusted, the shaft 157, to the left in Figure 13, is shown slidably keyed within a sleeve portion 157$^a$ thus permitting the supporting brackets carrying the inner end of the shaft 157 to move toward and away from the longitudinal center line of the machine when the adjusting mechanism heretofore described is actuated. The chains 153, on opposite sides of the raceway, it will be understood, are driven in identically the same manner and so as to have their adjacent book engaging runs travel in the same direction.

The book, with its cover sheet, after passing over the hot-plate, travels along the raceway toward the rear end of the machine where it is made to ride with its back downwardly between a pair of upwardly disposed curved wings or plates 165, 165; the plates or wings being flared and curving gradually inwardly and upwardly so as to induce the cover-sheet to fold up entirely against the side of the book. The rear edge or back of the book with the cover will be caused to ride over the rollers 166, one of which is mounted intermediate of the wings or plates while the others are mounted slightly beyond and at the ridge or crown of the book or pamphlet receiving rack or trough 167 which flares downwardly toward opposite sides of the machine as shown in Figure 13.

The trough 167, at a point beyond the rollers 166, is provided with a transversely disposed slot, through which an arm 168 is disposed and whose lower end is supported by and connected to rods or arms 169 which in turn are secured to the upper end of a lever 170 which is pivoted at 171 to the end frame of the machine; while the lower end of the lever is provided with a connecting rod 172. The opposite end of the connecting rod 172 is pivotally secured to a crank 173 mounted on a short shaft 174 which is provided with a sprocket 175 which in turn receives a sprocket chain 176 which leads upwardly and in turn passes about a sprocket 177 secured to the shaft 87 which extends lengthwise of the book race-way portion of the machine and is provided with a spiral gear 179 which in turn meshes with a spiral gear 180 secured on the main drive or pulley shaft 114 (see Figure 12).

The arm 168 is provided with a stacker blade 168$^a$ whereby the finished or covered books are alternately stacked in opposite ends of the receiving trough and away from the intermediate or crown portion of the trough where the covered books are delivered from the race-way.

It will be understood that while the side walls 130 of the race-way, as well as the feed chains 153 are yieldingly held in normal position by means of the springs 147 and 152, respectively,—whereby the race-way is adapted to slight variations in books or pamphlets of a given thickness—the race-way may be enlarged laterally to accommodate books or pamphlets of greater thickness by simultaneously rotating the spindles 139 at both ends of the last mentioned race-way, located in the same side of the machine, namely through the medium of the hand-wheels 139$^a$, whereby the one side wall 130, with its supporting members as well as one of the feed-chains 153, will be moved away from the opposite side wall and correlated elements; the side walls and feed-chains still being held in normal correlated relation as previously described.

In order that the traveling elements of the raceway, to-wit the belt 102, as well as the chains 153, may remain taut, I provide suitable take-up or tension means, as for example the mechanism indicated at 181 in Figure 4, comprising a pivotally mounted roller under spring pressure adapted to bear up against the lower strand or portion of the belt 102; while the chains 153 (which are disposed vertically, traveling about vertically disposed axes) pass around the ends of the angle bars or members 131, which at predetermined points are also provided with suitable takeup mechanism comprising tension rollers 182 trunnioned in horizontally slotted brackets and extension plate or wing 183 arranged on the angle bars.

The book or pamphlet feeding portion of the machine, in the particular exemplification of the invention as disclosed in the drawings, comprises a suitable table or ledge 225 which is supported by suitable brackets as at 226 and 227 secured to the main frame of the machine; with one side of the table or ledge 225 shown provided with an abutting ledge consisting of an angle iron 228 see Figure 1, whereby the books or pamphlets may be properly stacked and aligned, while the rear edges thereof are disposed downwardly on the table or ledge.

Suitably mounted in the supporting frame of the table or ledge, and at opposite ends thereof, are sprocket wheels 229 and 230; the sprocket wheel 229 being properly carried in journal bearings adapted to have movement in a direction lengthwise of the table or ledge so as to maintain chains 231 in proper taut condition; the adjustment of the sprocket 229 being induced by a screw 232 disposed through the stationary block 233. The endless chains (of which there are at least two arranged in parallel spaced relation as shown in Figure 1) are adapted to travel along the top of the table or ledge 225 so as to have the rear edges of the books or pamphlets, which are indicated at B, rest on and be carried by the chains; the opposite ends of the table or ledge being provided with openings to permit the passage of the chains and the upper perimeters of the sprocket wheels. In order that the books or pamphlets may be maintained in their vertical position as indicated in Figure 18, I provide a suitable follower block as at 234 which is of sufficient weight and rests on the chains so as to travel therewith. The sprocket 230 has its trunnion provided with a suitable ratchet wheel 235 with which a pawl 236 engages.

The side of the table or ledge is provided with a bracket or arm 237 to which a link 238 is pivotally connected, whose lower end carries the pivoted pawl 236. The link 238 is oscillated by means of a rod 239, whose lower end is pivoted to a block 240 adjustably carried by a trunnion 241 of a gear wheel 242 which is operated by means of intermeshing pinions 243 and 244 and driven from the driving shaft 87. The block 240 is so formed that the pivotal point of rod 239 may be adjusted in its relation to the axis 241 of the gear 242 so as to increase or lengthen the stroke of rod 239 (see Fig. 44) and thus determine the throw of link 238 and the pawl 236; in other words so as to cause the travel of the chains 231 to be commensurate with the thickness of a given type of book or pamphlet which is intended to be fed into the machine for the purpose of affixing a cover-sheet thereto or for the purpose of taping or stripping the rear edge. The inner end of the table or ledge 225 is provided with a short rotatable shaft 245 which carries a pair of lugs or cam members 246; the lugs or cams 246 being each shown provided with a slight lip (see Fig. 18) which is adapted to engage with the edge of the book, adjacent the side disposed toward the follower block 234, so as to separately lift and force the succeeding books or pamphlets, at successive intervals, off the ledge or table and cause each book or pamphlet to be dropped, rear edge downwardly, into the book-receiving channel or passage formed by the vertically disposed plates 99 and 100.

In order that the fed book or pamphlet may be prevented from tipping toward the opposite side of the machine, I show the table or ledge provided with the inclined brackets or arms 247 which carry a rod 248 preferably shown provided with rollers 249, see Figure 1, against which the book may rest without, however, interfering with its downward movement when the lower or rear edge is released by the projections or cams 246. The inclined arms 247 are shown provided with a number of openings (which may also be slots) so as to permit adjustment of the rod 248 in keeping with the size of the books or pamphlets operated on.

The lower edge of the plate 100 of the book channel or passage, on the outer side thereof, has the book-holding member or trip plate 101 pivotally secured thereto as previously described so that when in normal position, a portion of the plate 101, will be disposed into the passageway so as to receive the rear edge of the dropping book and to retain the same until the trip plate is engaged by a lug or finger 81 secured to the intermediate conveyor chain 80; the forward edge of the trip plate (relative to the direction from which the cover-sheet is being conveyed) as shown in Fig. 1 being preferably slightly beveled to enable it to slide off the lug or finger 81 and swing rearward beneath plate 100, thereby releasing the book or pamphlet and permitting the rear edge to drop onto the glue supplied portion of the cover-sheet or the tape, as the case may be. As the cover-sheet, or the tape, is continuously traveling beneath the passage-way or channel intermediate of plates 99 and 100, the tripped book will immediately pass from between said plates 99 and 100 and therefore beyond the edge of plate 101 and allow the trip plate or member 101 to swing back (by its own weight) into position to receive the next succeeding book forced into the channel or passageway by the cam members or lugs 246. As is clearly evident from the construction shown and described, by adjusting the throw of rod 239, the pawl 236 will be given either greater or less movement so as to engage with a greater or lesser number of teeth on ratchet wheel 235 and as a result the chains 231 will be given a greater or lesser degree of intermittent movement so as to advance the books a distance commensurate with the thickness thereof and thus successively bring the books into position where a single book or pamphlet will be engaged by the cam members or lugs 246.

In Figure 30, I show a modified form of the invention in so far as means for driving the chains 153 of the book race-way. In this construction, the stub-shafts 154 for carrying the sprockets 154ª are mounted in brackets or arms substantially similar to that previously described; with one of the arms or brackets, for example the one to the left in Figure 3, being provided with a similar slide block 134 mounted in the slideway or bracket portion 135 and controlled by means of the hand wheel 139ª; it being understood that a pair of the stub-shafts with sprockets are arranged on both sides of the machine, at each end of the book race-way, which race-way is shown in its entirety in Figure 4. The construction shown in Figure 30 merely differs in so far as the mechanism for driving the stub-shafts with the sprocket wheels is concerned; that is to say upper ends of the stub-shafts are provided with spiral gears 250 adapted to mesh with a gear 251 mounted on a shaft 252 suitably supported and which is also provided with a sprocket 253 to receive the sprocket drive chain 254 which passes about an idler sprocket 255 disposed at the outer side of the supporting bracket or standard; the chain passing downward about a sprocket 256 secured on a shaft 257 which is in turn also provided with a gear 258 meshing with a gear 162ª secured to the transversely disposed shaft 163ª. The shaft 163ª is provided with a sprocket 259 adapted to receive a sprocket chain which is also disposed about a sprocket wheel on the pulley or main drive shaft 114. In order that the sprocket chains 254 may be kept taut, I provide the tension mechanism comprising an arm 260 secured at 261 to the bracket or standard of the machine; the arm 260 being held in its adjusted positions by screwing up the nut 261. The outer end of the arm 260 is provided with a sprocket 262 over which the sprocket chain 254 passes. The tension-applying mechanism just described is intended for use more especially on the side of the raceway which is laterally adjustable through the operation of the hand wheel 139ª, namely the side disposed to the left in Figure 30, because a considerable slack in the chain will be produced when the slidable block is moved outwardly so as to carry the sprocket wheels 154ª on the adjacent side away from the opposite side of the raceway. The tension-applying means on the opposite side is substantially similar, consisting of the sprocket 262 mounted on the end of a short link 263 also adjustably secured to the standard or bracket of the machine. It will be understood that the balance of the machine is identical with that previously described; the construction in Figure 30 merely disclosing sprocket and chain driving mechanism for the race-way sprocket chains instead of employing the horizontally disposed shafts 157 and the vertically disposed shafts 160, as shown in Figure 13.

At the initial or forward end of the book race-way, I prefer to provide the depending members or blades 264, 264, see Figures 4 and 43, adapted to extend beneath the plane of the endless elements of the race-way, in order to engage with the sides of a book or pamphlet at a point near to the rear bound edge thereof; the depending members being more especially advisable when comparatively thin narrow pamphlets or books are being operated on.

I have shown and described my invention adapted to either applying cover-sheets to books or pamphlets or stripping books or pamphlets where separate front and back cover-sheets have been stitched to the book-sections, and have shown what I believe to be the simplest embodiments of my invention, having described the same in terms which have been employed merely as terms of description and not as terms of limitation, as structural modifications are possible and may be made without, however, departing from the spirit of my invention.

What I claim and desire to secure by Letters Patent is:—

1. A machine of the character described, comprising endless cover-sheet conveying means provided with cover-sheet engaging portions, means disposed along the path of the cover-sheet whereby one side of the latter is scored, and means, disposed beyond said scoring means, along the path of the cover-sheet whereby the opposite side of the cover-sheet is provided with adhesive material intermediate of the outer scores.

2. A machine of the character described, comprising cover-sheet conveying means composed of endless elements provided with adjustable cover-sheet engaging portions, cover-sheet scoring means whereby one side of the cover-sheet is provided with a plurality of parallely arranged scores, said scoring means comprising rotatable elements arranged in pairs with the elements of each pair adjustably secured together, and means whereby the scored cover-sheet on its opposite side is provided with adhesive material along a line disposed intermediate of the outer parallely arranged scores.

3. In a machine of the character described, endless cover-sheet conveying means provided with cover-sheet engaging portions, guiding means disposed along the path of the initial portion of the conveying means whereby the direction of travel of the cover-sheet is reversed and the cover-sheet delivered onto a second portion of the conveying means, regulable scoring means whereby the cover-sheet is provided with a number of scores in parallel relation and prearranged distances apart, and regulable means whereby the scored portion of the cover-sheet is provided with adhesive material to a predetermined extent.

4. In a machine of the character described, means for conveying the cover-sheet through the machine in opposite directions and different horizontal planes, cover-sheet engaging means adjustably secured to said conveying means, means whereby the cover-sheet is automatically positioned on the initial portion of the conveying means, means disposed along the path of the cover-sheet for providing the one side of the cover-sheet with a plurality of parallelly disposed scores, and regulable means whereby the opposite side of the cover-sheet is provided with adhesive material intermediate of the outer scores.

5. In a machine of the character described, cover-sheet conveying means, yieldable means arranged at the side of the conveying means whereby the cover-sheet is automatically adjusted transversely of the conveying means, rotatably mounted scoring means comprising a plurality of discs adjustably secured together in pairs whereby one side of the cover-sheet is provided with a plurality of scores, and rotatable glue-applying means whereby the opposite side of the cover-sheet is provided with adhesive material, said glue-applying means comprising a plurality of wheels mounted to permit adjustment in a direction transversely of the cover-sheet.

6. In a machine of the character described, cover-sheet conveying means comprising endless elements provided with cover-sheet engaging portions, cover-sheet positioning means for determining the position relative to said conveying elements, scoring means whereby the cover-sheet is scored on one surface with a plurality of scores, and adjustable means whereby the scored portion of the cover-sheet is provided with adhesive material.

7. In a machine of the character described, cover-sheet conveying means comprising a plurality of endless elements having adjustable cover-sheet engaging portions whereby positive movement of the cover-sheet is induced, scoring means disposed along the path of the cover-sheet for providing one side of the cover-sheet with a plurality of scores, means disposed beyond the scoring means whereby the opposite side of the scored portion of the cover-sheet is provided with adhesive material, adjustable means for forcing the cover-sheet into positive contact with said last means, in combination with means whereby the back of a book or pamphlet is delivered onto the glued portion of the cover-sheet.

8. In a machine of the character described, cover-sheet conveying means comprising endless elements having sheet engaging portions adjustably secured thereto, means disposed on opposite sides of the initial part of the conveying means, said means including yieldable cover-sheet engaging fingers, whereby the cover-sheet is positioned relative to said conveying means, means whereby one side of the cover-sheet is provided with a plurality of scores, means whereby the opposite side of the scored portion of the cover-sheet is provided with adhesive material, and means whereby a book or pamphlet is delivered onto said adhesive portion of the cover-sheet, said last mentioned means being controlled by the sheet engaging portions of one portion of the cover-sheet conveying means.

9. In a machine of the character described, two sets of cover-sheet conveyer arranged in different planes and traveling in opposite directions, each set comprising endless elements provided with upwardly disposed cover-sheet engaging portions, tranversely adjustable cover-sheet scoring means whereby the cover-sheet is provided with a number of scores at preselected distances apart, means whereby the opposite side of the scored portion of the cover-sheet is provided with adhesive material, book or pamphlet holding means adjacent to the path of the second set of said endless elements and mounted to be actuated by the cover-sheet engaging portions of said second set of conveyers.

10. In a machine of the character described, cover-sheet conveying means, laterally adjustable means whereby the cover-sheet is provided with a plurality of parallelly arranged scores, means whereby the scored portion of the cover-sheet on its opposite side is provided with adhesive material, book or pamphlet feeding means arranged above the path of a portion of the cover-sheet conveying means, means whereby the fed book is held in place above the traveling cover-sheet, said means being adapted to be actuated by portions of the conveying means and moved out of book-holding position when the cover-sheet reaches a predetermined point in its travel and the back of the book delivered onto the glue supplied portion of the cover-sheet, in combination with means arranged along the path of the cover-sheet, beyond the book-feeding means, whereby the glued portion of the cover-sheet is successively moved upwardly into parallel relation with the sides of the book, and yielding means for pressing the glued portion of the cover-sheet into intimate relation with the book.

11. In a machine of the character described, cover-sheet conveying means, means whereby the cover-sheet is positioned relative to said conveying means, scoring means whereby the cover-sheet is provided with a number of scores, means whereby the scored portion of the cover-sheet is provided with adhesive material, book or pamphlet-holding means adapted to be actuated by a portion of the cover-sheet conveying means whereby the rear of the book or pamphlet is delivered onto the glued portion of the cover-sheet when the latter reaches a predetermined point in the machine, means whereby the glued portion of the cover-sheet is forced upward into intimate relation with the book or pamphlet, and heated means adapted to contact with the glued portion of the cover-sheet to smooth out or iron the same.

12. A machine of the character described, comprising cover-sheet conveying means having adjustable cover-sheet engaging portions, at regulable scoring means for providing one side of the cover-sheet with a number of scores, glue-applying means whereby the opposite side of the scored surface of the cover-sheet is provided with glue, book or pamphlet delivery means arranged above a portion of the cover-sheet conveying means and adapted to be actuated by said portion of the cover-sheet engaging portions when the latter reach predetermined points in their travel and the book or pamphlet thereby delivered onto the glued portion of the cover-sheet, means whereby the glued portion of the cover-sheet is forced upwardly against the sides adjacent the back, and heated means adapted to contact with the back and adjacent portions of the sides of the covered book for heating and smoothing out the glued portions of the cover-sheet into intimate relation of the book or pamphlet.

13. A machine of the character described, comprising cover-sheet conveying means provided with adjustable sheet-engaging projections, scoring means for providing one side of the cover-sheet with a prearranged number of scores in predetermined spaced relation, means whereby the opposite side of the scored portion of the cover-sheet is provided with adhesive material, book or pamphlet retaining means disposed adjacent to a portion of the cover-sheet conveying means and operable by the sheet-engaging projections thereof whereby the back of the book or pamphlet is brought into contact with the glue supplied portion of the cover-sheet, means whereby the cover-sheet is subjected to pressure and the glue supplied portion thereof forced into intimate relation with the book or pamphlet, heated smoothing means adapted to contact with the opposite side of the glue supplied portion of the cover-sheet, and means whereby the book or pamphlet with the cover-sheet is made to travel past the pressure applying means and across said heated smoothing means.

14. In a machine of the character described, endless cover-sheet conveying means provided with adjustable sheet engaging portions, scoring means whereby one side of the cover-sheet is provided with a number of scores, means disposed beyond the scoring means whereby the opposite side of the scored portion of the cover-sheet is provided with adhesive material, book or pamphlet holding means arranged adjacent to the path of a portion of said cover-sheet conveying means and mounted to be actuated by one of the cover-sheet engaging portions, whereby the back of the book or pamphlet is released onto the glued portion of the cover-sheet, a regulable raceway for conveying the book or pamphlet and the cover-sheet to the delivery end of the machine, means disposed adjacent to said raceway for forcing the glued portion of the cover-sheet into intimate relation with the back and sides of the book or pamphlet, and heated means located adjacent to the raceway for smoothing the glued portion of the cover-sheet.

15. In a machine of the character described, a race way adapted to maintain the book or pamphlet in vertical position with its back downward on the glued portion of a cover-sheet, said race way being provided with side walls consisting of non-moving portions and moving portions, both portions of the side walls being mounted to yield laterally, and means whereby the side walls of the race way may be adjusted laterally to books of varying thickness.

16. In a machine of the character described, a plurality of book-raceway comprising a plurality of endless elements on opposite sides of the raceway, means whereby said elements are yieldingly held in place and yieldable pressure exerted on the sides of the book or pamphlet traveling through said raceway, and means whereby the spaced relation between opposite sides of the raceway may be regulated.

17. In a machine of the character described, vertically disposed plates arranged in lateral spaced relation to provide the side walls of a book raceway, a plurality of endless elements arranged on both sides of the raceway, means whereby said elements are held in normal position and permitted to yield laterally, upwardly inclined rollers arranged along said raceway for engaging opposite sides of the book or pamphlet to apply an upward pressure on the cover-sheet adjacent to the glued portion thereof, and means whereby said rollers are made to rotate in directions opposite to the direction of travel of the book or pamphlet.

18. In a machine of the character described, a book raceway comprising a plurality of endless elements, means whereby said elements are held in normal position and permitted to yield laterally, inclined rollers, disposed along the raceway for engaging opposite sides of the book or pamphlet passing along said raceway, adapted to apply a wiping upward pressure on the cover-sheet adjacent the glued portion thereof, and means, disposed in advance of said rollers, whereby the cover-sheet is partially brought into juxtaposition with the sides of the book or pamphlet.

19. In a machine of the character described, a book raceway whereby the book is maintained in vertical position, comprising a plurality of endless elements disposed along opposite sides of the raceway, means whereby said elements are held in normal position and permitted to yield laterally, inclined rollers, disposed along the raceway adapted to apply an upward wiping pressure on the cover-sheet adjacent the glued portion thereof, means whereby the rollers are made to rotate in directions opposite to the direction of travel of the book, and means disposed in advance of said rollers whereby the cover-sheet is brought upward against the sides of the book for engagement by said rollers.

20. In a machine of the character described, cover-sheet conveying means comprising endless elements, means adjustably secured to said endless elements for engaging the rear edge of the cover-sheet and to ensure proper positioning thereof, means disposed along the path of said endless elements whereby the cover-sheet is provided with a plurality of scores in spaced relation, means whereby one side of the cover-sheet coincident with the scored portion is provided with adhesive material, and book or pamphlet holding means arranged above the path of a portion of said conveying means for delivering the back of the book or pamphlet onto the glued portion of the cover-sheet, said means being operable when the cover-sheet reaches a predetermined point in its travel.

21. In a machine of the character described, a plurality of endless elements provided with adjustable projections for engaging the rear edge of the cover-sheet and to position the same, scoring means disposed along the path of the cover-sheet for providing the latter with a plurality of scores, rotatable means disposed along the path of the cover-sheet whereby the opposite surface of the scored portion thereof is provided with adhesive material, a second set of endless elements for receiving the scored and glue-supplied cover-sheet from the first mentioned elements, the second set of endless elements being provided with adjustable cover-sheet engaging portions, book or pamphlet retaining means disposed above said second set of endless elements and in the path of the cover-sheet engaging portions on one of the endless elements of said second set, whereby said retaining means is tripped and the back of the book or pamphlet delivered onto the glue-supplied portion of the cover-sheet.

22. In a machine of the character described, cover-sheet conveying means comprising a plurality of endless elements having cover-sheet engaging projections, rotatable scoring means for providing the cover-sheet with a number of scores, rotatable glue-applying means for providing the scored portion of the cover-sheet with adhesive material, a second set of endless elements provided with upwardly disposed projections for engaging the rear edge of the cover-sheet delivered thereto by the first set of endless elements, the projections on the intermediate endless element of said second set being adjustable lengthwise of said endless element so as to advance its position relative to the projections on the other elements of said set, and means for retaining the book or pamphlet with its back downward above the path of the cover-sheet, said last means being mounted to be tripped by the last mentioned adjustable projection, whereby the back of the book or pamphlet is dropped onto the glue-supplied portion of the cover-sheet.

23. In a machine of the character described, cover-sheet conveying means, comprising a plurality of endless elements having projections for engaging the rear edge of the cover-sheet, regulable scoring means whereby the cover-sheet may be provided with scores at varying distances apart, and regulable glue-applying means rotatably mounted beyond said scoring means for providing the opposite side of the cover-sheet with adhesive material, means disposed above the cover-sheet for maintaining the latter in firm relation with said glue-applying means, a second set of endless elements arranged in a plane beneath the first mentioned conveying means for receiving the glue-supplied cover-sheet from the first set of endless elements, book-retaining means whereby the book or pamphlet is retained with its back disposed downwardly at a point above the path of said second mentioned elements, means carried by one of the second mentioned endless elements adapted to actuate said book-retaining means and cause the book or pamphlet to drop back downward onto the glue-supplied portion of the cover-sheet, and parallelly arranged means whereby the book or pamphlet and the cover-sheet are carried to the delivery end of the machine.

24. In a machine of the character described, a book race-way comprising endless elements disposed along opposite sides of the race-way whereby the book is maintained in vertical position with its back downward, and cover-wiper means whereby the cover-sheet is brought upward adjacent to the back of the book, said means comprising a pair of rotating elements disposed on opposite sides of the race-way and adapted to rotate tangentially to the back of the book and in opposite direction to the travel of the book.

25. In a machine of the character described, book and cover-sheet conveying means comprising vertically disposed walls arranged in spaced relation, endless elements rotatably mounted on opposite sides of the race-way and beneath said vertically disposed walls, cover-sheet engaging means whereby the opened-out cover is gradually forced upwardly at the back of the book, and cover-sheet wiper means comprising a pair of rotatably mounted members disposed on opposite sides of the race-way and adapted to rotate in a direction opposite to the travel of the book and to apply pressure to the cover-sheet in an upwardly sloping manner.

26. In a machine of the character described, cover-sheet conveying means, adhesive-applying means adapted to apply adhesive to the cover-sheet traveling with the conveyor, book-feeding means, disposed above the path of the cover-sheet conveying means, adapted to feed a book back downward onto the adhesive supplied portion of the cover-sheet, pivoted means for retaining the fed book adapted to release it onto the cover-sheet when the latter is positioned beneath said means, means disposed along the path of the book and the opened-out cover-sheet whereby the adhesive supplied portion of the cover-sheet will be wiped upwardly against the back and sides of the book, and heated means whereby the back and adjacent portions of the sides of the cover-sheet with the book are subjected to an "ironing" or smoothing operation.

27. In a machine of the character described, cover-sheet conveying means comprising a plurality of endless elements having cover-sheet engaging portions whereby the cover-sheet is made to travel through a definite path, means disposed along the path of the cover-sheet whereby it is provided with glue, book-feeding means for delivering the back of a book onto the glue-supplied portion of the cover-sheet, said book-feeding means comprising book-holding means, endless elements adapted to travel lengthwise of said means whereby the books are advanced toward one end of said means, means whereby said endless elements are given movement equal to the thickness of the books to be fed, and means for engaging with the back of the foremost book whereby said book is lifted off of said holding means and delivered into a race way above the glue-supplied portion of the cover-sheet.

28. A machine of the character described, means for feeding books into a book race way, comprising a book holding table, endless elements arranged to travel lengthwise of the table in contact with the downwardly disposed backs of the books, means whereby said elements are caused to move to an extent substantially equal to the thickness of the books to be fed, and means adapted to engage with the foremost book to lift it off the book holding table and said endless elements and delivered into the race way.

29. In a machine of the character described, provided with a book race-way, book-feeding means comprising a slotted book holding table, a pair of endless elements adapted to travel in the slots of said table toward said race-way, means whereby a plurality of books are maintained on said endless element in substantially vertical position with their backs downward, means whereby the endless elements are caused to move intermittently to a degree substantially equal to the thickness of the books to be fed, and means rotatably mounted at the delivery end of said table intermediate of the endless elements and the race-way whereby each advancing book is delivered into the race-way, with its back downward.

30. In a machine of the character described, the combination of means for scoring a continuous advancing cover-sheet along a plurality of spaced points, an adhesive container, means for removing adhesive from the container and applying the same to the opposite surface of the scored portion of the cover-sheet, mechanism for subsequently delivering a book or pamphlet back downward onto the adhesive supplied portion of the cover-sheet, and means, rotating in opposite direction to the travel of the book and tangentially thereto for progressively wiping the adhesive supplied portion of the cover-sheet upwardly about the bound edge of the book or pamphlet.

31. In a machine of the character described, provided with a book and cover-sheet race way, regulable means disposed on opposite sides of the race way for progressively wiping the cover-sheet upwardly about the bound edge of the book or pamphlet, and heated means, across which the covered book is caused to travel, for smoothing the glue supplied portion of the cover-sheet.

32. In a machine of the character described, means for continuously advancing the cover-sheets, comprising a slotted cover-sheet receiving table, an abutting member or straight-edge disposed lengthwise of the table, yielding means disposed at the opposite side of the table whereby the cover-sheet is aligned with said straight-edge, endless elements traveling through the slots in said table and provided with upstanding cover-sheet engaging fingers arranged at predetermined points, scoring means rotatably mounted along the path of the cover-sheet for providing one side of the cover-sheet with a predetermined number of scores in prearranged relation, glue-applying means disposed beyond said scoring means whereby one side of the cover-sheet is provided with adhesive material to a predetermined extent, and means whereby the cover-sheet is made to travel into a different plane from the plane of its initial travel.

33. In a machine of the character described, means for continuously advancing the cover-sheet, comprising endless elements, cover-sheet aligning means disposed on opposite sides of said endless elements, adjustable scoring means disposed along the path of said endless elements, glue-applying means disposed beyond the scoring means for providing one side of the cover-sheet with adhesive material to a predetermined extent, and adjustable means whereby the cover-sheet is maintained in intimate relation with the glue-applying means during travel of the cover-sheet thereover.

34. In a machine of the character described, means for continuously advancing the cover-sheets, comprising endless elements having adjustable cover-sheet engaging fingers, yielding means whereby the cover-sheets are aligned, scoring means for providing the cover-sheet with a number of scores, glue-applying means disposed beneath the initial path of said cover-sheet for applying glue to the adjacent side of the cover-sheet during its travel, means whereby the cover-sheet is conveyed into a path beneath its initial path and caused to travel in a direction opposite to its initial direction of travel, with the glue-supplied portion thereof presented upwardly, and further means for continuously advancing the cover-sheet.

35. In a machine of the character described, means for continuously advancing the cover-sheets, comprising endless elements arranged in parallel spaced relation and provided with cover-sheet engaging portions, means disposed on opposite sides of the endless elements whereby the cover-sheet is aligned during its travel, scoring means disposed above the path of the cover-sheet for providing a number of scores, adjustable glue-applying means disposed beneath the path of the cover-sheet whereby the lower side of the cover-sheet is provided with a glue-strip, means along the path of said endless elements whereby the cover-sheet is caused to travel into a lower plane, a second set of endless elements disposed in said lower plane for receiving the scored and glued cover-sheet, said second mentioned endless elements being provided with cover-sheet engaging portions adjustably secured thereto, and means whereby the tension of said endless elements may be controlled.

36. In a machine of the character described, comprising, in combination, means for continuously advancing the cover-sheets throughout scoring and adhesive-applying operations thereon, means for feeding the book or pamphlet back downward onto the scored and glue-supplied portion of the cover-sheet, a book race-way disposed in a plane above that of the flat cover-sheet, said race-way consisting of vertically disposed walls arranged in spaced relation, endless elements disposed beneath the walls and traveling about vertically disposed axes, means whereby the walls and said endless elements are yieldingly held in position, and regulable means for supporting the wall and endless element on one side of said race-way, whereby said wall and endless element may be moved toward or away from the opposite wall and endless element to provide a race-way for books or pamphlets of different thickness.

37. In a machine of the character described, the combination of means for continuously advancing cover-sheets throughout scoring and adhesive applying operations, means for intermittently feeding and delivering the books or pamphlets back downward onto the scored and glue-applied portion of the cover-sheets when the latter reach predetermined points in their travel, a race-way adapted to receive the vertically disposed book and opened-out cover-sheet for conveying the same to the delivery end of the machine, said race-way comprising vertically disposed walls and endless elements arranged beneath the walls to rotate about vertically disposed axes, the walls and endless elements being mounted to yield for variations in books or pamphlets of a given thickness, adjustable means for carrying both ends of the wall and endless element on one side of the race-way, and means whereby said adjustable means at both ends of the race-way may be simultaneously operated to adjust the race-way to books or pamphlets of different thickness.

38. In a machine of the character described, the combination of means for continuously advancing the cover-sheets throughout scoring and adhesive-applying operations thereon, means for feeding the books or pamphlets to the glue-supplied cover-sheet when the latter reaches a predetermined point in its travel, a book race-way for receiving the fed book to maintain the latter in vertical position while the adhered cover-sheet is in opened-out position, said race-way comprising endless elements yieldingly disposed on opposite sides of the race-way for engagement with the book-sides, means whereby the endless element on one side of the race-way may be shifted in its relation to the endless element on the opposite side of the race-way, means disposed beneath the race-way whereby the opened-out cover-sheet at the glue-supplied portion thereof is gradually forced upwardly into intimate relation with the back and sides of the book or pamphlet, a portion of said last means being rotatable in a direction opposite to the direction of travel of the book or pamphlet and adapted to apply an upwardly and rearwardly disposed wiping action, and heated smoothing means beneath the race-way for engaging with the portion of the cover-sheet about the back and bound sides of the book or pamphlet.

39. In a machine of the character described, a raceway for the book or pamphlet and an adhesive supplied cover-sheet, means for pressing the adhesive supplied portion of the cover-sheet into intimate relation with the stitched or stapled edge of the book or pamphlet, and yielding wiper means for exerting independent pressure on various portions of the cover-sheet on the rear edge of the book or pamphlet.

40. In a machine of the character described, means for bringing the adhesive supplied portion of the cover-sheet into intimate relation with the stitched or stapled edge of the book or pamphlet, and multi-digitated means for exerting independent pressure on the various adhesive supplied portions of the cover-sheet at the rear edge of the book or pamphlet.

41. In a machine of the character described, means for bringing the adhesive supplied portion of the cover-sheet into intimate relation with the back of the book or pamphlet, and adjustable multi-digitated means adapted to exert independent pressure on different portions of the adhesive supplied part of the cover-sheet.

42. In a machine of the character described, cover-sheet conveying means, means whereby the cover-sheet is provided with adhesive material, means for delivering the back of the book or pamphlet into contact with the adhesive supplied portion of the cover-sheet, and revolving means for rubbing the adhesive supplied portion of the cover-sheet into intimate relation about the back and bound sides of the book or pamphlet.

JOHN J. PLEGER.

Witnesses:
  G. HEIDMAN,
  F. A. FLORELL.